US007096338B2

(12) United States Patent
Takahashi et al.

(10) Patent No.: US 7,096,338 B2
(45) Date of Patent: Aug. 22, 2006

(54) STORAGE SYSTEM AND DATA RELOCATION CONTROL DEVICE

(75) Inventors: Toru Takahashi, Kamakura (JP);
Tatsundo Aoshima, Yokohama (JP);
Nobuo Beniyama, Yokohama (JP);
Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/975,645

(22) Filed: Oct. 29, 2004

(65) Prior Publication Data
US 2006/0047930 A1 Mar. 2, 2006

(30) Foreign Application Priority Data
Aug. 30, 2004 (JP) ............................. 2004-250327

(51) Int. Cl.
*G06F 12/00* (2006.01)
(52) U.S. Cl. ...................... 711/165; 711/114; 711/170; 711/172; 711/202; 707/10; 707/204; 714/6
(58) Field of Classification Search ...................... None
See application file for complete search history.

(56) References Cited

U.S. PATENT DOCUMENTS

| 4,771,375 A | 9/1988 | Beglin et al. ............... 364/200 |
| 5,794,255 A | 8/1998 | Hayashi et al. ............. 707/205 |
| 6,757,778 B1 | 6/2004 | van Rietschote ............... 711/6 |
| 6,779,078 B1 | 8/2004 | Murotani et al. |
| 6,810,462 B1 | 10/2004 | Matsunami et al. ......... 711/112 |
| 2002/0099908 A1 | 7/2002 | Yamamoto et al. |
| 2002/0184463 A1 | 12/2002 | Arakawa et al. |
| 2003/0046491 A1 | 3/2003 | Katsurashima |
| 2003/0204597 A1 | 10/2003 | Arakawa et al. ............ 709/226 |
| 2003/0221063 A1 | 11/2003 | Eguchi et al. |

FOREIGN PATENT DOCUMENTS

| EP | 1130514 | 9/2001 |
| JP | 2001-67187 | 3/2001 |
| JP | 2001-249853 | 9/2001 |
| JP | 2001-337790 | 12/2001 |
| JP | 2003-345522 | 12/2003 |
| JP | 2004-70403 | 3/2004 |

*Primary Examiner*—Mano Padmanabhan
*Assistant Examiner*—Craig E Walter

(57) ABSTRACT

The present invention achieves data relocation in accordance with a user's policies, in an environment where a plurality of storage devices are combined. The volumes belonging to storage devices A–D are managed virtually integrally. A host recognizes a plurality of storage devices A–D as a single virtual storage device. The user is able to group the volumes belonging to the storage system, as a plurality of storage layers 1–3. For example, storage layer 1 can be defined as a high-reliability layer, storage layer 2, as a low-cost layer, and storage layer 3, as an archive layer. Each storage layer is constituted by a group of volumes corresponding to respective policies (high reliability, low cost, archiving). The user designates volumes to be moved V1 and V2, in group units, and indicates a storage layer forming a movement destination, whereby the data is relocated.

39 Claims, 21 Drawing Sheets

FIG. 7

| LUN# | LDEV | | VDEV | | | |
|---|---|---|---|---|---|---|
| | # | MAX. SLOT NO. | # | MAX. SLOT NO. | DEVICE TYPE | PATH INFORMATION |
| 1 | 1 | 10000 | 1 | 50000 | FC_Disk | INTERNAL PATH INFORMATION |
| 2 | 2 | 40000 | | | | |
| 3 | 3 | 50000 | 2 | 50000 | SATA_Disk | WWN, LUN |
| 4 | 4 | 50000 | 3 | 50000 | SATA_Disk | WWN, LUN |

MAPPING TABLE (T1)

FIG. 8

VOLUME ATTRIBUTE MANAGEMENT TABLE  T2

| LOGICAL ID | PHYSICAL ID | | RAID LEVEL | EMULATION TYPE | DISK TYPE | CAPACITY (GB) | USE STATUS | MODEL |
|---|---|---|---|---|---|---|---|---|
| | DEVICE NO. | Vol# | | | | | | |
| 001 | 1 | 01 | RAID1 | EMU1 | FC | 100 | IN USE | SS1 |
| 002 | 1 | 02 | RAID1 | EMU1 | FC | 100 | EMPTY | SS1 |
| 003 | 1 | 03 | RAID5 | EMU1 | FC | 100 | IN USE | SS1 |
| 004 | 1 | 04 | RAID0 | EMU1 | FC | 100 | IN USE | SS1 |
| 005 | 2 | 01 | RAID5 | EMU2 | FC | 40 | EMPTY | SS2 |
| 006 | 2 | 02 | RAID5 | EMU2 | SATA | 100 | EMPTY | SS2 |
| 007 | 2 | 03 | RAID1 | EMU2 | FC | 200 | IN USE | SS2 |
| 008 | 3 | 01 | RAID5 | EMU2 | SATA | 100 | EMPTY | SS3 |
| 009 | 3 | 02 | RAID6 | EMU2 | SATA | 100 | EMPTY | SS3 |
| 010 | 3 | 03 | RAID5 | EMU2 | SATA | 50 | IN USE | SS3 |
| 011 | 3 | 04 | RAID1 | EMU2 | FC | 80 | EMPTY | SS3 |
| ... | ... | ... | ... | ... | ... | ... | ... | ... |

| CORRESPONDING HOST MANAGEMENT TABLE | | |
|---|---|---|
| LOGICAL ID | HOST | APPLICATION |
| 001 | mail-1.mycomp.com | App1 |
| 007 | mail-2.mycomp.com | App1 |
| 010 | mail-4.mycomp.com | App2 |
| 012 | mail-3.mycomp.com | App1 |
| 018 | www.mycomp.com | App3 |
| 019 | www.mycomp.com | App3 |
| 031 | mail-5.mycomp.com | App2 |
| 041 | db.mycomp.com | App4 |
| 043 | db.mycomp.com | App4 |
| 049 | db.mycomp.com | App4 |
| ... | ... | ... |

| # | GROUP NAME | ID OF CONSTITUENT VOLUMES | CURRENT LAYER |
|---|---|---|---|
| | MIGRATION GROUP MANAGEMENT TABLE | | |
| 1 | FILE SYSTEM VOLUMES | 018, 019, 070, 071, 073 | LOW-COST LAYER |
| 2 | CUSTOMER MANAGEMENT DB VOLUMES | 041, 043 | HIGH-RELIABILITY LAYER |
| 3 | PURCHASE MANAGEMENT DB VOLUMES | 049 | HIGH-RELIABILITY LAYER |
| 4 | MAIL DATA VOLUMES 1 | 001, 007, 012 | HIGH-RELIABILITY LAYER |
| 5 | MAIL DATA VOLUMES 2 | 010, 031, 033, 062 | LOW-COST LAYER |
| 6 | ... | ... | ... |

| MIGRATION GROUP MANAGEMENT TABLE ||||
|---|---|---|---|
| # | GROUP NAME | ID OF CONSTITUENT VOLUMES | CURRENT LAYER |
| 1 | FILE SYSTEM VOLUMES | 018, 019, 070, 071, 073 | LOW-COST LAYER |
| 2 | CUSTOMER MANAGEMENT DB VOLUMES | 041, 043 | HIGH-RELIABILITY LAYER |
| 3 | PURCHASE MANAGEMENT DB VOLUMES | 049 | HIGH-RELIABILITY LAYER |
| 4 | MAIL DATA VOLUMES 1 | 001, 007, 012 | HIGH-RELIABILITY LAYER |
| 5 | MAIL DATA VOLUMES 2 | 010, 031, 033, 062 | LOW-COST LAYER |
| 6 | ... | ... | ... |

S1 INSTRUCT RELOCATION TO PRESCRIBED LAYER ⇩

S2 TARGET CANDIDATE SELECTION PROCESSING

⇩ T7

S3 PRESENT VOLUME CORRESPONDENCE TABLE

| SOURCE ID | TARGET CANDIDATE ID |
|---|---|
| 001 | 085 |
| 007 | 008 |
| 012 | 006 |

OK ⇐ S5 RELOCATION IMPLEMENTATION PROCESSING

NG ⇔ S4 REVISE TARGET CANDIDATES

FIG. 16

| WEB BROWSER | | | | | | |
|---|---|---|---|---|---|---|
| SOURCE/TARGET | LOGICAL ID | RAID GROUP | RAID LEVEL | EMULATION TYPE | CAPACITY |
| SOURCE | 7:23 | 2-1 | RAID5 | EMU2 | 6.87GB |
| TARGET (MODIFY) | 1:23 | 3-1 | RAID5 | EMU2 | 6.87GB |
| SOURCE | 7:24 | 2-1 | RAID5 | EMU2 | 6.87GB |
| TARGET (MODIFY) | 1:23 | 2-3 | RAID5 | EMU2 | 6.87GB |
| SOURCE | 7:25 | 2-1 | RAID5 | EMU2 | 6.87GB |
| TARGET (MODIFY) | 1:23 | 3-4 | RAID5 | EMU2 | 6.87GB |
| SOURCE | 7:26 | 2-1 | RAID5 | EMU2 | 6.87GB |
| TARGET (MODIFY) | 1:23 | 3-1 | RAID5 | EMU2 | 6.87GB |

WEB BROWSER

| VOLUME MAPPING | |
|---|---|
| SOURCE VOLUME | 7:23 ▼ |
| EMULATION TYPE | EMU2 |
| CAPACITY | 6.87GB |

| SOURCE VOLUME | | | | |
|---|---|---|---|---|
| LOGICAL ID | RAID GROUP | RAID LEVEL | STORAGE DEVICE NUMBER | VOLUME NUMBER |
| 7:23 | 2-1 | RAID5 | SS1#123 | 2:34 |

| TARGET CANDIDATE VOLUME | | | | |
|---|---|---|---|---|
| LOGICAL ID | RAID GROUP | RAID LEVEL | STORAGE DEVICE NUMBER | VOLUME NUMBER |
| ● 0:11 | 3-1 | RAID5 | SS2#456 | 2:84 |
| ○ 0:12 | 3-1 | RAID5 | SS2#456 | 2:53 |
| ○ 0:13 | 3-5 | RAID5 | SS3#789 | 1:92 |

(SAVE AND CONTINUE) (SAVE AND END) (CLOSE)

VOLUME ATTRIBUTE MANAGEMENT TABLE

| LOGICAL ID | PHYSICAL ID | | RAID LEVEL | EMULATION TYPE | DISK TYPE | CAPACITY (GB) | USE STATUS | I/O RESPONSE TIME (MS) |
|---|---|---|---|---|---|---|---|---|
| | DEVICE NO. | Vol# | | | | | | |
| 001 | 1 | 01 | RAID1 | EMU1 | FC | 100 | IN USE | 0.8 |
| 002 | 1 | 02 | RAID1 | EMU1 | FC | 100 | EMPTY | – |
| 003 | 1 | 03 | RAID5 | EMU1 | FC | 100 | IN USE | 0.6 |
| 004 | 1 | 04 | RAID0 | EMU1 | FC | 100 | IN USE | 1.0 |
| 005 | 1 | 01 | RAID5 | EMU2 | FC | 40 | EMPTY | – |
| 006 | 2 | 02 | RAID5 | EMU2 | SATA | 100 | EMPTY | – |
| 007 | 2 | 03 | RAID1 | EMU2 | FC | 200 | IN USE | 0.9 |
| 008 | 2 | 01 | RAID5 | EMU2 | SATA | 100 | EMPTY | – |
| 009 | 3 | 02 | RAID6 | EMU2 | SATA | 100 | EMPTY | – |
| 010 | 3 | 03 | RAID5 | EMU2 | SATA | 50 | IN USE | 3.2 |
| 011 | 3 | 04 | RAID1 | EMU2 | FC | 80 | EMPTY | – |
| ... | ... | ... | ... | ... | ... | ... | ... | ... |

STORAGE SYSTEM AND DATA RELOCATION CONTROL DEVICE

CROSS-REFERENCE TO RELATED APPLICATIONS

This application relates to and claims priority from Japanese Patent Application No. 2004-250327 filed on Aug. 30, 2004, the entire disclosure of which is incorporated herein by reference.

BACKGROUND OF THE INVENTION

The present invention relates to a storage system and a data relocation control device.

The storage system is constituted by comprising at least one or more storage device, known as a disk array subsystem, for example. This storage device provides a storage region based on a RAID (Redundant Arrays of Independent Disks), wherein disk drives, such as hard disk drives, semiconductor memory drives, or the like, are arranged in an array configuration, for example. A host computer (hereinafter, called "host") accesses the logical storage region provided by the storage device and reads or writes data.

The amount of data managed by businesses and organizations such as regional authorities, educational institutions, financial institutions, government and municipal offices, and the like, is growing steadily year on year, and storage devices are added and replaced as this data volume increases. As the data volume increases and the composition of storage systems becomes more complicated in this way, techniques have been proposed for improving the efficiency of use of storage systems by locating the data relating to various application programs, such as main management software and database management software, in suitable locations according to the value of that data (Japanese Patent Laid-open No. 2003-345522, Japanese Patent Laid-open No. 2001-337790, Japanese Patent Laid-open No. 2001-67187, Japanese Patent Laid-open No. 2001-249853, and Japanese Patent Laid-open No. 2004-70403.)

The respective reference patents mentioned above disclose techniques for relocating data by copying data stored in one volume to another volume, on the basis of disk performance information and use information.

However, in the techniques described in these references, it is necessary to relocate data individually, in volume units, and the user is not able to move volumes between freely defined layers, and hence usability is poor. Moreover, in the techniques described in the aforementioned patent references, since data is relocated in volume units, it is difficult to relocate data in a group of related volumes, together, in one operation. Furthermore, the techniques described in the aforementioned patent references focus exclusively on the relocation of the data, and do not give consideration to the processing after relocation of the data. Therefore, usability is poor from this viewpoint also.

SUMMARY OF THE INVENTION

One object of the present invention is to provide a storage system and a data relocation control device capable of relocating data distributed over a plurality of storage devices, in a more simple fashion. Furthermore, one object of the present invention is to provide a storage system and a data relocation control device having improved usability, by allowing the data stored respectively in a plurality of mutually related volumes to be relocated together, in one operation. Moreover, one object of the present invention is to provide a storage system and a data relocation control device having improved usability, by causing the processing required after data relocation to be executed automatically. Other objects of the present invention will become apparent from the following description of the embodiments.

In order to achieve the aforementioned objects, the storage system according to the present invention comprises: a plurality of storage devices respectively having at least one or more volumes; a virtualization section for managing the volumes belonging to the respective storage devices, virtually, in a unified fashion; a storage section for storing volume attribute information for managing the attribute information of each of the volumes; and a relocating section for relocating a designated movement source volume to a designated storage layer, with respect to a plurality of storage layers respectively generated on the basis of a plurality of previously determined policies and the volume attribute information.

Here, a "policy" can be set as desired by the user, and the same volume can belong to different storage layers. Moreover, the storage layers can be set in units corresponding to each storage device, or they can be set to span a plurality of storage devices.

For example, storage layer management information containing policy identification information for respectively identifying each of the policies, and layer composition conditions respectively associated with each of the policy identification information, is provided, and storage layers corresponding to each of the policies can be generated respectively by means of a group of volumes satisfying the respective layer composition conditions. The layer composition conditions may include at least one of the RAID level, the drive type, the storage capacity, the type of storage device, and the use status.

More specifically, the storage layers are generated in accordance with policies defined by the user, such as a high-performance layer constituted by high-performance disks, a low-cost layer constituted by low-cost disks, and the like. One or a plurality of volumes belonging to the respective storage layers may be located in the same storage device, or they may be located in different storage devices.

The policies defining the respective layers are determined by layer composition conditions which can be set by the user. For example, when defining a high-performance layer, the user should establish conditions for selecting high-performance disks and high-performance storage devices, as the layer composition conditions. Moreover, for example, when defining a low-cost layer, the user should set conditions for selecting inexpensive disks, as the layer composition conditions. The storage layer is composed by means of volumes which satisfy the respective layer composition conditions.

When data in a volume belonging to a particular storage layer is to be relocated, then the source volume and the target storage layer should be designated, respectively. Consequently, the data in the designated source volume is moved to a volume belonging to the designated target storage layer.

The relocating section is able to relocate the designated source volumes, in units of groups, each group consisting of a plurality of mutually related volumes, for example. The plurality of mutually related volumes may be, for example, a group of volumes storing data used by the same application program, or a group of volumes storing data forming the same file system, or the like. It is still possible to group volumes together, even if there is little relation between the respective data.

The relocating section can also execute prescribed processing that has been associated previously with the target storage layer, with respect to the moved volume, when the designated source volume has been moved to the target storage layer. The prescribed processing may be, for example, setting of access attributes, such as a read-only setting, or creation of redundant volumes, or the like.

The relocating section includes a target candidate selecting section for selecting a target candidate volume to which the storage contents of the designated source volume can be copied, and a presenting section for presenting the target candidate volume selected by the target candidate selecting section, to the user; and the target candidate selecting section can select a volume having matching essential attributes that are previously established from among the attributes of the source volume, as the target candidate volume, by referring to the volume attribute information.

The volume attribute information may comprise static attributes and dynamic attributes, and prescribed attributes of the static attributes may be set as the essential attributes. The essential attributes may include at the least the storage capacity of the volume.

In this way, the relocating section selects volumes which match the essential attributes of the source volume, as target candidate volumes. If there are a plurality of target candidate volumes having matching essential attributes, then the target candidate selecting section selects only one of the target candidate volumes, on the basis of the degree of matching of other attributes apart from the essential attributes. Attributes other than the essential attributes may be, for example, the RAID level, the disk type, the model of storage device, and the like. In other words, if a plurality of volumes matching the essential attributes are extracted, then the volume of these volumes having a composition most closely resembling that of the source volume is selected as the target candidate volume.

The relocating section may further comprise a changing section for changing the target candidate volume selected by the target candidate selecting section. The changing section can cause the target candidate volume to be selected from among the target candidate volumes having the matching essential attributes but not selected.

For example, the changing section can change the provisionally selected target candidate volumes, in such a manner that the target candidate volumes do not become concentrated in a particular RAID group, or in such a manner that data groups having different use statuses, such as data that is accessed randomly and data that is accessed sequentially, is not located in the same RAID group. The changing section may change the target candidate volume on the basis of instructions from the user.

The data relocation control device according to another aspect of the present invention controls data relocation in a plurality of volumes located in a distributed fashion in a plurality of storage devices. The respective volumes are managed virtually in a unified fashion, by a virtualization section, and a storage section and a control section are provided. (A) The storage section respectively stores: (a1) volume attribute information containing, at the least, identification information, the RAID level, drive type, storage capacity, and use status, for each of the volumes; and (a2) storage layer management information containing policy identification information for respectively identifying a plurality of policies that can be defined by a user, and layer composition conditions respectively associated with each of the policy identification information. (B) The control section may comprise a relocating section for relocating a designated source volume to a designated storage layer, with respect to a plurality of storage layers generated respectively on the basis of the storage layer management information and the volume attribute information.

A further data relocation control device according to the present invention is a device for managing volumes belonging respectively to a plurality of storage devices, in a unified fashion, and controlling the relocation of data stored in each of the volumes; comprising: a virtualization section for managing the volumes belonging to the respective storage devices, virtually, in a unified fashion; a storage section for storing volume attribute information for managing the attribute information of each of the volumes; and a relocating section for relocating a designated movement source volume to a designated storage layer, with respect to a plurality of storage layers respectively generated on the basis of a plurality of previously determined policies and the volume attribute information.

The present invention may also be interpreted as data relocation method as described below, for example. More specifically, it is a method for relocating data stored in a plurality of volumes distributed in a plurality of storage devices, to volumes in the same or different storage devices, comprising the steps of: virtually managing all the volumes belonging to the respective storage devices integrally; managing the attribute information of respective volumes as volume attribute information; previously establishing a plurality of policies; generating a plurality of storage layers on the basis of this plurality of policies and the volume attribute information; setting a source volume and a target storage layer; and relocating a designated source volume to a designated storage layer among the storage layers.

At least a portion of the means, functions and steps according to the present invention may be constituted by computer programs which are read in and executed by a microcomputer. Computer programs of this kind may be distributed by copying them onto a storage medium, such as a hard disk, optical disk, or the like. Alternatively, computer programs may also be supplied via a communications network, such as the Internet.

BRIEF DESCRIPTION OF THE DRAWINGS

FIG. 7 is an illustrative diagram showing the composition of a mapping table;

FIG. 8 is an illustrative diagram showing the composition of a volume attribute management table;

FIG. 10 is an illustrative diagram showing the composition of a corresponding host management table;

FIG. 11 is an illustrative diagram showing the composition of a migration group management table;

FIG. 13 is an illustrative diagram showing a general view of the overall operation of data relocation;

FIG. 16 is an illustrative diagram showing an example of a screen for presenting a proposal for data relocation;

FIG. 17 is an illustrative diagram showing an example of a screen for revising the presented plan;

FIG. 19 is an illustrative diagram showing the composition of a volume attribute management table used in an storage system relating to a third embodiment of the present invention;

DESCRIPTION OF THE SPECIFIC EMBODIMENTS

Figure 1:
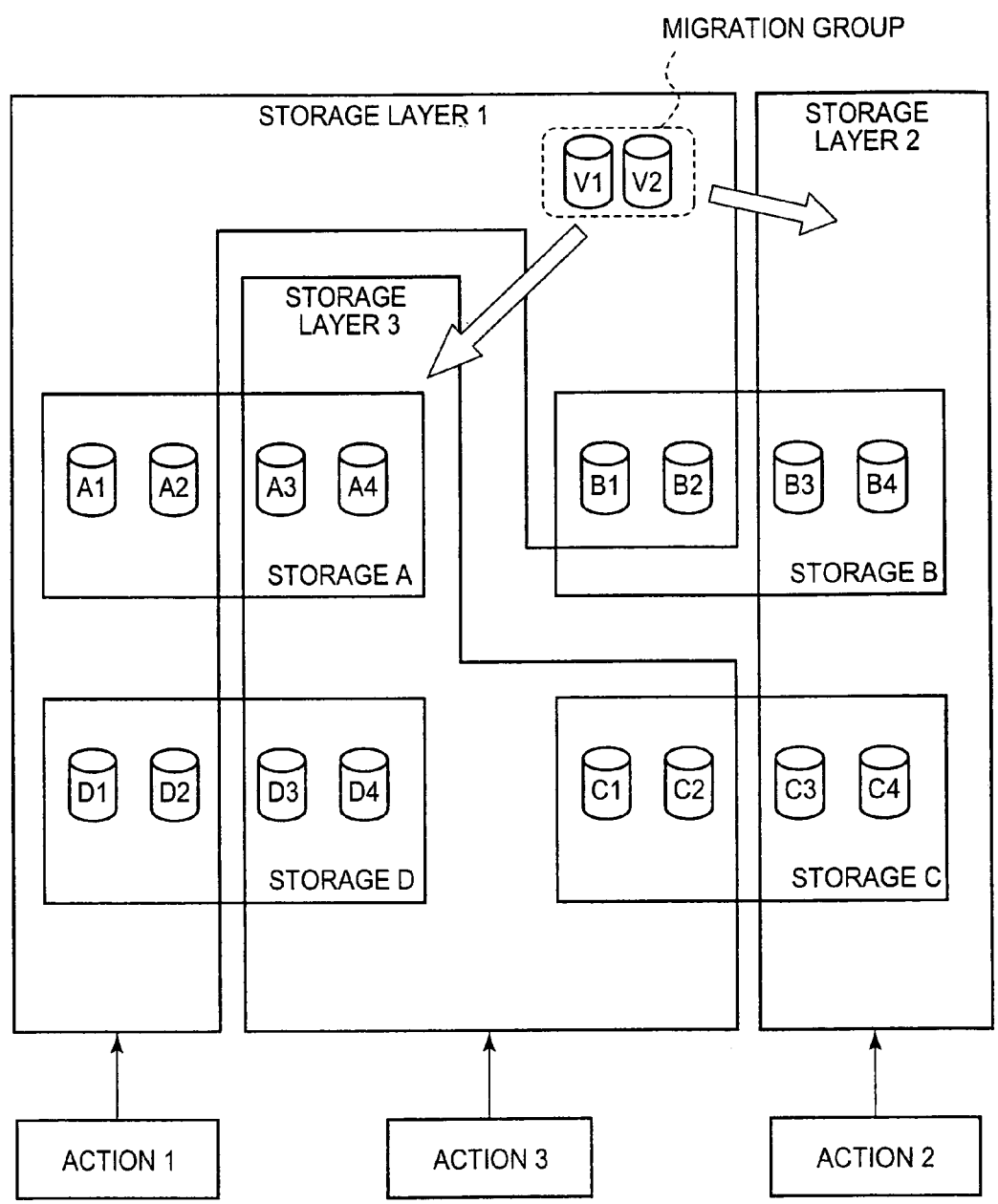
FIG. 1 is an illustrative diagram showing the concept of an embodiment of the present invention.

Below, embodiments of the present invention are described with respect to the drawings. FIG. 1 is an illustrative diagram showing a schematic view of the general concepts of the present embodiment. As described below, the storage system according to the present embodiment comprises a plurality of storage devices A–D.

The volumes belonging to the respective storage devices A–D are managed jointly in a virtual manner, and a host (see FIG. 2) recognizes the plurality of storage devices A–D together, as a single virtual storage device.

The respective storage devices A–D respectively comprise volumes A1–A4, B1–B4, C1–C4 and D1–D4. Each of these volumes is a logical storage region established on a physical storage region provided by a physical storage drive, such as a hard disk drive, semiconductor memory drive, optical disk drive, or the like, for example.

Here, the respective storage devices A–D may be provided with drives of the same type, or they may respectively combine drives of different types. Therefore, even in the case of volumes located within the same storage device, there may be differences in the volume attributes, such as performance, cost, and the like.

The user is able to group the respective volumes belonging to the storage system, as a plurality of storage layers 1–3. For example, any one storage layer 1 may be defined as a high-reliability layer. A high-reliability layer is constituted by a group of volumes comprising high-reliability drives, such as fiber channel disks (FC disks), forming a RAID1 array. Furthermore, another storage layer 2 may be defined as a low-cost layer, for example. The low-cost layer is constituted, for example, by a group of volumes comprising inexpensive drives, such as SATA (Serial AT Attachment) disks, forming a RAID5 array. Furthermore, yet another storage layer 3 may be defined as an archive layer, for example. The archive layer may be constituted by a group of volumes established on inexpensive disks of less than a prescribed capacity, for example.

As shown in FIG. 1, the respective storage layers 1–3 are constituted in a virtual fashion, spanning the respective storage devices A–D. More specifically, the user is able to define a plurality of the volumes constituting the storage system, as a desired storage layer, such as a high-reliability layer, a low-cost layer, a high-speed response layer, an archive layer, or the like, freely, on the basis of the business use standards (policy). The policy can be set independently of the composition of the storage system, and depending on the conditions for constituting each storage layer, a portion of the volumes may belong to a plurality of storage layers, or alternatively, another portion of the volumes may not belong to any of the storage layers.

The respective storage layers 1–3 may respectively comprise volume groups which form objects for data relocation. One example is indicated by the migration group consisting of two volumes V1, V2 in the storage layer 1. These volumes V1, V2 are mutually related volumes, for example, volumes storing data groups used by the same application program, or data groups constituting the same filing system, or the like.

The value of data declines progressively as time passes, for example. Data of high value is located in a high-reliability layer and is used frequently by application programs. Desirably, data whose value has dropped with the passage of time is moved to another storage layer. This is because there are limits on the storage resources available in the high-reliability layer.

Therefore, the user investigates relocation of the data stored in the plurality of mutually related volumes V1, V2, and decides, for example, to move the data from storage layer 1 to storage layer 3 (which is the archive layer in this case). The user issues a single instruction indicating relocation of the source volumes V1, V2, and instructs that they be moved to storage layer 3.

Thereby, in storage layer 3, which is the movement destination, volumes respectively capable of storing the volumes V1 and V2 constituting the migration group are selected, and the data is copied to these selected volumes. When copying has been completed, the data in the source volumes V1, V2 can be deleted, and these volumes become empty and can be reused.

Here, it is possible previously to associate prescribed actions with the respective storage layers 1–3, in accordance with the policies for the respective storage layers 1–3. An "action" indicates a prescribed information process or data operation carried out within the storage layer. For example, storage layer 1 which is defined as a high-reliability layer may be previously associated with a process for generating a replica of the relocated data. Moreover, storage layer 2 which is defined as a low-cost layer may not be associated previously with any action, for example. Furthermore, storage layer 3 which is defined as an archive layer may be previously associated with a plurality of processes, namely, a process for generating a replica of the relocated data, and a process for establishing a read-only access attribute, for example.

If the volumes V1, V2 constituting the migration group are copied to a volume belonging to storage layer 3, then the prescribed action associated with storage layer 3 is carried out automatically. A replica is generated of the data relocated to storage layer 3, and the data is set to a read-only status, thereby prohibiting modification of that data.

Here, when the data in the respective volumes V1, V2 is relocated, then the volumes to which that data can be copied are selected within the target storage layer. Each volume has its own attribute information. Volume attribute information includes, for example, identification information for identifying each volume a RAID level, disk type, storage capacity, use status indicating whether or not the volume is in use, the model of storage device to which the volume belongs, and the like.

It is not necessary for all of these volume attributes to be matching in the source volumes (V1, V2) and the target candidate volumes, and it is sufficient for only essential attributes to be matching. An example of an essential attribute is the storage capacity, for instance. More specifically, a volume which has a storage capacity equal to or exceeding the storage capacity of the source volume can be selected as a target volume.

If more than the required number of volumes having the matching essential attributes are detected, then the degree of matching of other attributes apart from the essential attributes is taken into consideration, and the volumes having attributes closest to those of the source volumes can be selected as the target volumes. In this example, the volume attributes are divided broadly into two types: essential attributes and other attributes, but the composition is not limited to this and it is also possible, for example, to determine the degree of matching between volumes by classifying attributes into three or more types, such as essential attributes, semi-essential attributes and other attributes, for instance, and applying suitable weightings to each respective type of attribute.

1. First Embodiment

Figure 2:
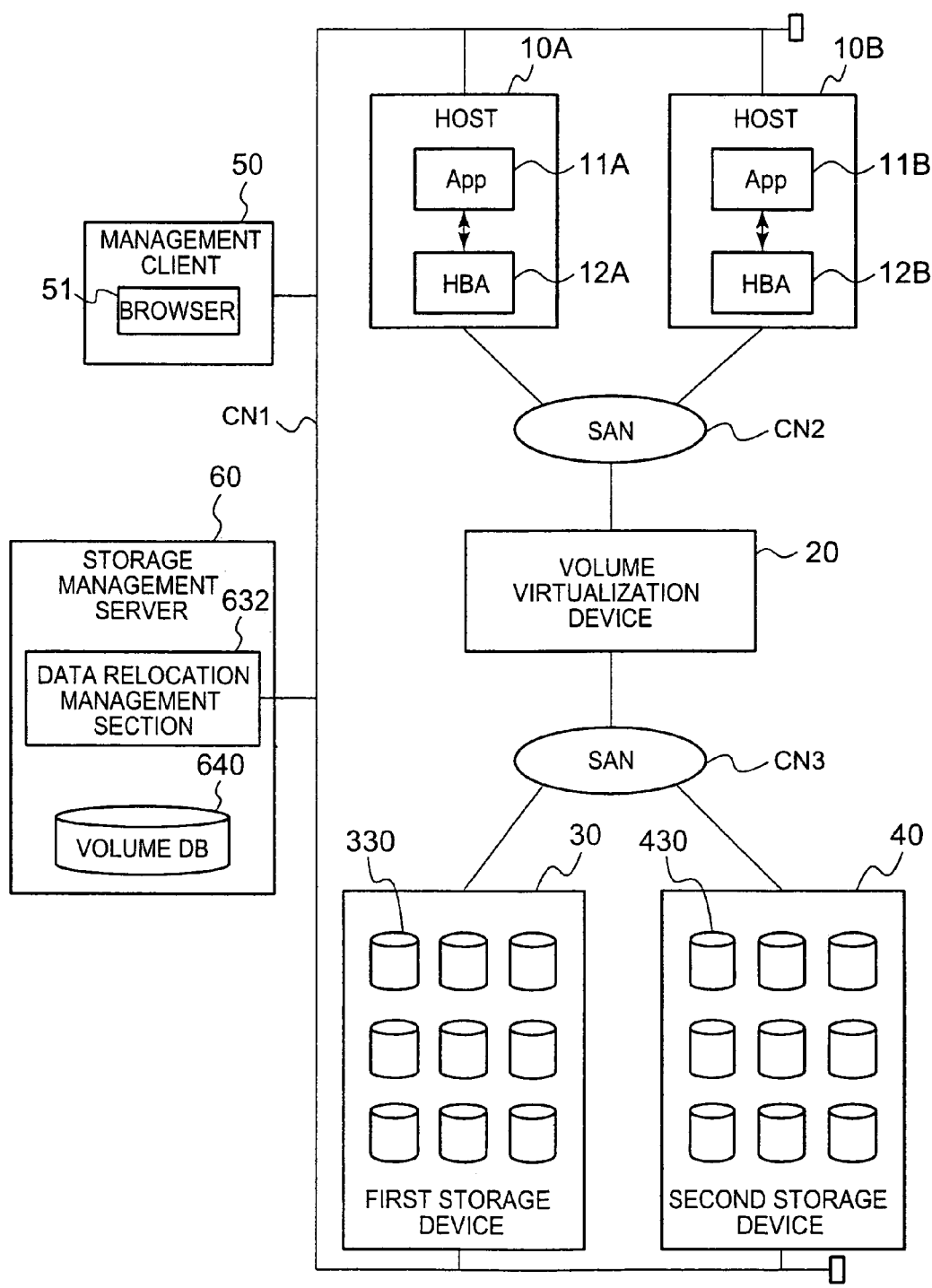
FIG. 2 is a block diagram showing a general overview of a storage system.

FIG. 2 is a block diagram showing an approximate view of the general composition of a storage system. As described hereinafter, this storage system may be constituted by comprising, for example, a plurality of hosts 10A and 10B (indicated as "host 10" in the diagram where no particular distinction is required), a volume virtualization device 20, a plurality of storage devices 30 and 40, a management client 50, and a storage management server 60. These elements are interconnected via a communications network CN1, such as a LAN (Local Area Network), or the like.

The hosts 10A and 10B are constituted by a computer system, such as a server, personal computer, workstation, mainframe computer, portable information terminal, or the like. A plurality of open type hosts and a plurality of mainframe type hosts may be combined in the same storage system, for example.

The hosts 10A and 10B may be provided with application programs (abbreviated to "App" in the drawings) 11A and 11B (described as "application program 11" where no particular distinction is required), and HBAs (Host Bus Adapters) 12A and 12B (described as "HBA 12" where no particular distinction is required). A plurality of application programs 11 and HBAs 12 may be provided respectively in each one of the hosts 10.

Examples of an application program 11A and 11B include, for example, an electronic mail management program, a database management program, a file system, or the like. The application programs 11A and 11B may be connected to a plurality of client terminals located outside the scope of the drawings, by means of a communications network separate to the plurality of client terminals illustrated, and they may provide information processing services in accordance with requests from the respective client terminals.

The HBA 12 is used for transmission and reception of data between the host and the storage system, and is connected to the volume virtualization device 20 via a communications network CN2. Here, the communications network CN2 is, for example, a LAN, a SAN (Storage Area Network), the Internet, or a dedicated circuit, or the like. In the case of an open type host, for example, then data transfer is conducted on the basis of a protocol such as TCP/IP (Transmission Control Protocol/Internet Protocol), FCP (Fiber Channel Protocol), iSCSI (internet Small Computer System Interface), and the like. If the host computer is a mainframe type host, then data transfer is conducted in accordance with a communications protocol, such as FICON (Fiber Connection: registered trademark), ESCON (Enterprise System Connection: registered trademark), ACONARC (Advanced Connection Architecture: registered trademark), FIBARC (Fiber Connection Architecture: registered trademark), or the like.

Apart from this, the respective hosts 10A and 10B may also be respectively installed with a management program (not illustrated), such as a path control program, or the like. A management program of this kind carries out processing for distributing load between a plurality of HBAs 12 and switching the path when a fault occurs, for example.

Figure 3A:
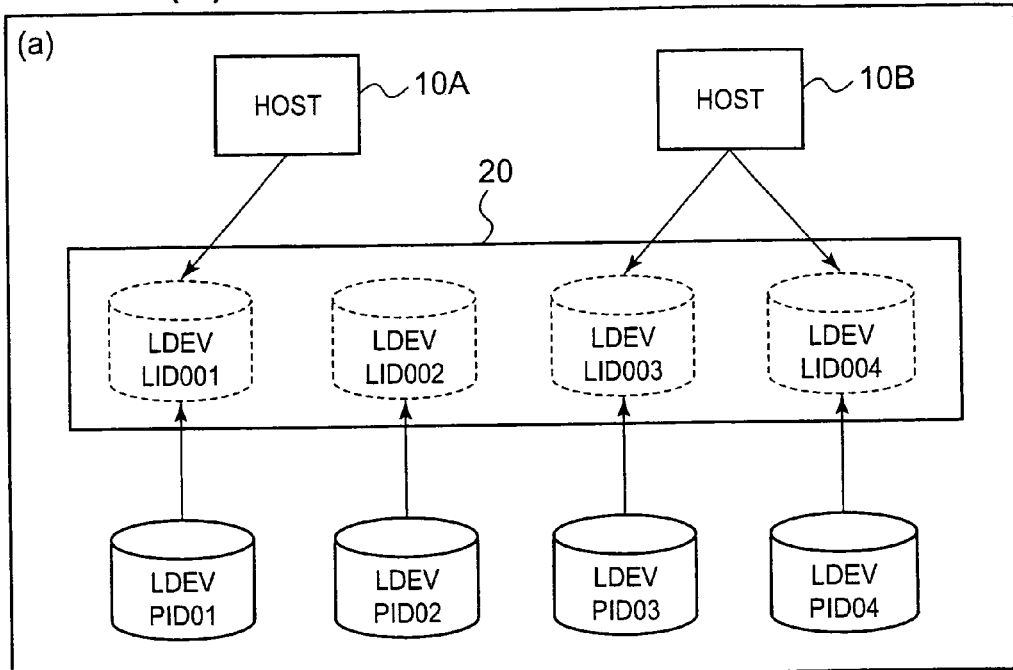
FIG. 3 is an illustrative diagram showing a schematic view of a state where volumes distributed in an storage system are managed virtually.

The volume virtualization device (hereinafter, also referred to as "virtualization device") 20 virtualizes the volumes 330, 430, and the like, present in the storage system, in such a manner that they appear as a single virtual storage device. As shown in FIG. 3(a), for example, the virtualization device 20 presents a plurality of logical volumes (LDEVs) indicated by the identification information LID001–LID 004, to the respective hosts 10. These logical volumes are respectively associated with other logical volumes indicated by the identification information PID01–PID 04. A logical volume having identification information PID is a physical volume which actually stores data, and a logical volume which can be recognized directly by the host 10 is a virtual volume.

Figure 3B:
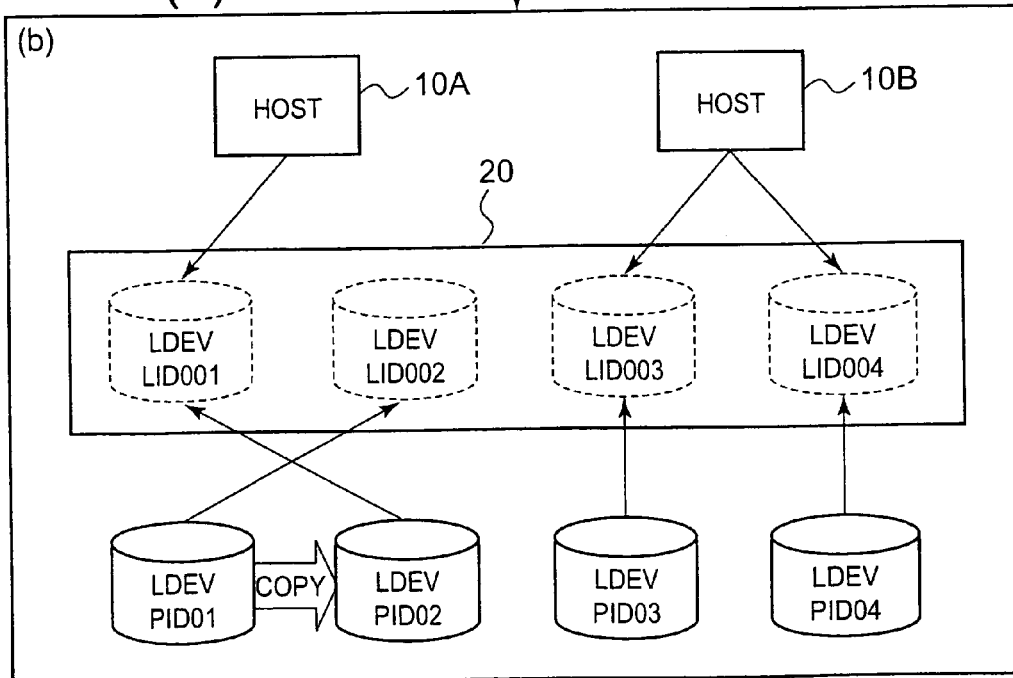

By controlling mapping between the virtual volumes and the physical volumes, it is possible to move data in a manner that is transparent to the host 10. For example, as shown in FIG. 3(b), if data stored in a physical volume (PID01) is moved to another physical volume (PID02), then after copying the data between these physical volumes, the mapping between the physical volume and the virtual volume should be re-established. Alternatively, by exchanging the identification information between the virtual volume (LID001) and the virtual volume (LID002), it is possible to change the device forming the destination for data storage, without the host 10 being aware.

In this way, the virtualization device 20 virtualizes the plurality of physical volumes of different types located on the storage system, and it manages these volumes in a unified manner and presents the volumes to the host 10. As described below, the virtualization device 20 may be provided inside the storage device, or it may be provided in a high-performance intelligent switch. Moreover, as described below, the virtualization device 20 and the storage management server 60 may be provided in the same computer.

Returning to FIG. 2, the storage devices 30 and 40 respectively comprise logical volumes (physical volumes) 330, 430, and are connected respectively to the virtualization device 20, by means of a communications network CN3, such as a SAN. The storage devices 30 and 40 read and write data from and to the volumes, in response to requests from a host 10. An example of the composition of the storage device is described in further detail below.

The management client 50 is, for example, constituted by a computer system, such as a personal computer, a workstation, or a portable information terminal, and it comprises a web browser 51. The user may issue various types of instructions to the storage system, or acquire various types of information from the storage system, for example, by logging in to the storage management server 60 by means of the web browser 51.

The storage management server 60 is a computer system for managing relocation of volumes in the storage system, and the like. An example of the composition of the storage management server 60 is described below, but it may comprise, for example, a data relocation management section 632 and a volume database (indicated as "DB" in the drawings) 640.

Figure 4:
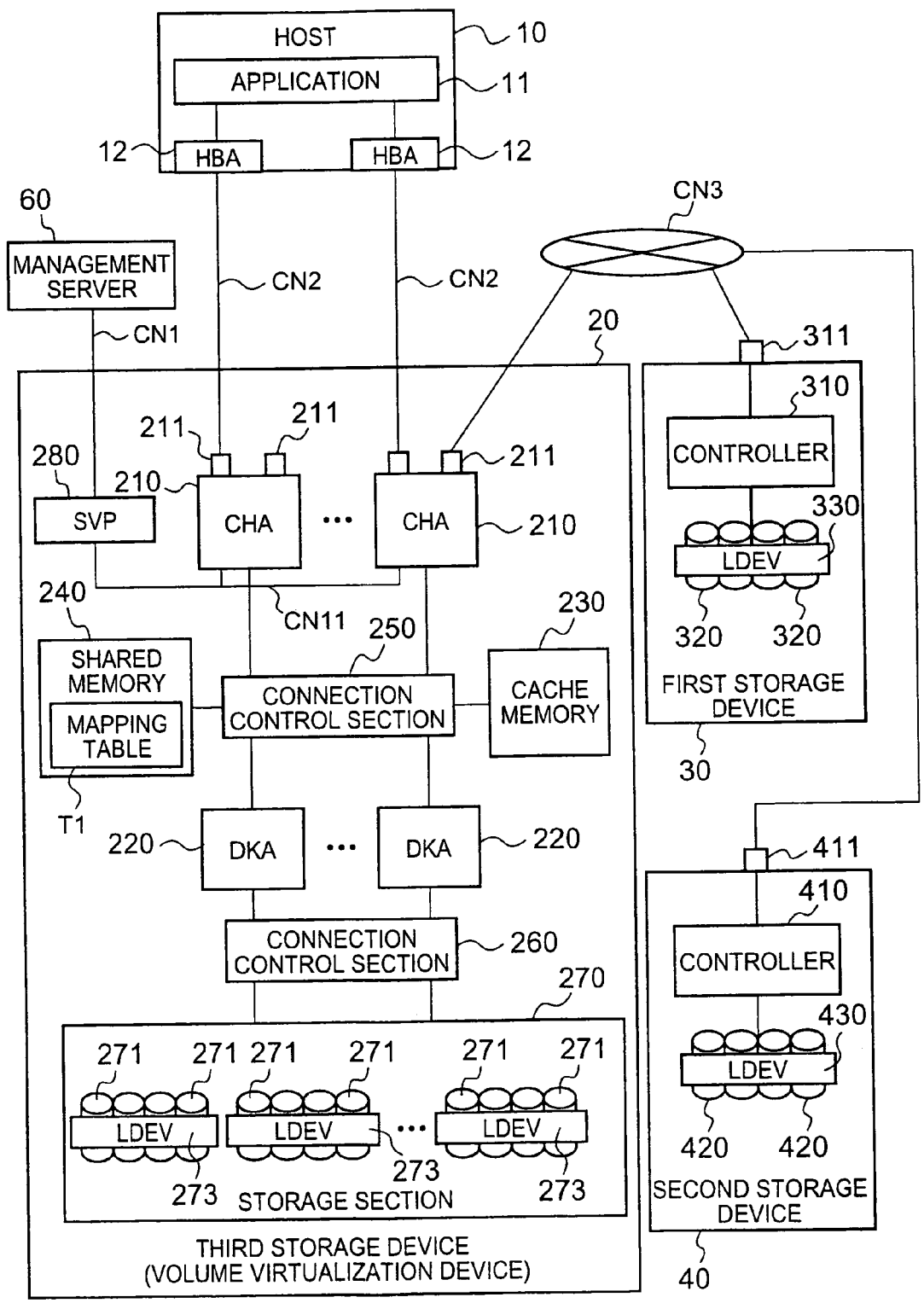
FIG. 4 is a block diagram showing the hardware composition of a storage system.

FIG. 4 is a block diagram showing an approximate view of the hardware composition of the storage system, in a case where the virtualization device 20 is constituted by a storage device.

In this embodiment, the virtualization device 20 may also be called the third storage device 20. The third storage device 20 can be constituted by comprising, for example, a plurality of channel adapters (hereinafter, "CHA") 210, a plurality of disk adapters (hereinafter, "DKA") 220, a cache memory 230, a shared memory 240, connection control sections 250 and 260, a storage section 270, and an SVP 280, which are respectively described hereafter.

The CHAs 210 serve to control transmission and reception of data between the host 10 and the external first storage device 30 and second storage device 40, and they may be constituted by a microcomputer system comprising a CPU, memory, input/output circuit, and the like, for example. Each of the CHAs 210 may be provided with a plurality of communications ports 211, and data may be exchanged independently and respectively via each of these communications ports 211. Each CHA 210 corresponds respectively one type of communications protocol, and is prepared in accordance with the type of host 10. However, it is also possible for each of the CHAs 210 to be composed so as to correspond respectively to a plurality of communications protocols.

The DKAs 220 control transmission and reception of data with the storage section 270. Similarly to the CHAs 210, the DKAs 220 may be constituted by a microcomputer system comprising a CPU, memory and the like, for example. For example, each of the DKAs 220 accesses the respective disk drives 271 and performs data read out or data writing, by converting a logical block address (LBA) designated by the host 10 into an address on a physical disk. The functions of the CHAs 210 and the functions of the DKAs 220 may also be integrated into one or a plurality of controllers.

The cache memory 230 stores write data written from the host 10 and read data read out from the host 10. The cache memory 230 may be constituted by a volatile or a non-volatile memory, for example. If the cache memory 230 is constituted by a volatile memory, then desirably, a memory back-up is performed by means of a battery power source, or the like, which is not illustrated. Although not shown in the drawings, the cache memory 230 may be constituted by two regions, namely, a read cache region and a write cache region, and the data stored in the write cache region may be stored in multi-layered fashion. In other words, since read data is also present on the disk drive 271 in exactly the same form, then even if this read data happens to be lost, it simply needs to be read out again from the disk drive 271, and hence there is no need for multi-layered storage. On the other hand, write data is only present in the cache memory 230 of the storage device 20, and therefore, from the viewpoint of reliability it is desirable to store it in a multi-layered fashion. Ultimately, the decision whether or not to store the cache data in multiple layers depends on the specifications.

The shared memory (which may also be called the control memory) 240 may be constituted by a non-volatile memory, or it may be constituted by a volatile memory. Control information, management information, and the like, such as a mapping table T1, for example, is stored in the shared memory 240. Information, such as this control information, and the like, can be managed in a multi-layered fashion by means of a plurality of memories 240. An example of the composition of this mapping table T1 is described further below.

Here, the shared memory 240 and the cache memory 230 may be constituted respectively by separate memory packages, or the cache memory 230 and the shared memory 240 may be provided in the same memory package. Furthermore, one portion of the memory may be used as a cache region and another portion thereof may be used as a control region. In other words, the shared memory and the cache memory may also be constituted as the same memory.

The first connection control section (switch section) 250 respectively interconnects each of the CHAs 210, the DKAs 220, the cache memory 230, and the shared memory 240. Thereby, all of the CHAs 210 and the DKAs 220 may respectively access the cache memory 230 and the shared memory 240, in an independent fashion. The connection control section 250 may be constituted as an ultra-high-speed cross-bar switch, or the like, for example. The second connection control section 260 respectively connects each of the DKAs 220 with the storage section 270.

The storage section 270 is constituted by a plurality of disk drives 271. The storage section 270 may be provided in the same frame as the controller sections, such as the respective CHAs 210 and the respective DKAs 220, or it may be provided in a separate frame from the controller sections.

A plurality of disk drives 270 may be provided in the storage section 271. For the disk drives 271, it is possible to use an FC disk (fiber channel disk), a SCSI (Small Computer System Interface) disk, a SATA (Serial AT Attachment) disk, or the like. Moreover, the storage section 270 does not have to be constituted by disk drives of the same type, and it is also possible to combine disk drives of a plurality of different types.

Here, in general, the performance declines in order, from an FC disk, to a SCSI disk to a SATA disk. It is possible, for example, to use different types of disk drive according to the state of use of the data, in such a manner that data which is accessed frequently (data of high value, or the like) is stored in a high-performance FC disk, and data which is accessed infrequently (data of low value, or the like) is stored in a low-performance SATA disk. A plurality of logical storage regions can be provided in a hierarchically layered fashion in the physical storage regions provided by the respective disk drives 271. The composition of these storage regions is described further below.

The SVP (Service Processor) 280 is connected respectively to each of the CHAs 210 and the DKAs 220, by means of an internal network CN11, such as a LAN. In the diagram the SVP 280 is only connected to the CHAs 210, but the SVP 280 can also be connected respectively to each of the DKAs 220. The SVP 280 gathers the various statuses within the storage device 20 and supplies them to the storage management server 60, either directly or after processing.

The third storage device 20, which virtualizes the volumes, is an access point for processing data input and output requests from the host 10, and it is connected respectively to the first storage device 30 and the second storage device 40, via the communications network CN3. The drawing shows a state where two storage devices 30 and 40 are connected to the storage device 20, but the composition is not limited to this, and one storage device may be connected to the storage device 20, or three or more storage devices may be connected to the storage device 20.

The first storage device 30 may be constituted by comprising, for example, a controller 310, a communications port 311 for connecting to the third storage device 20, and a disk drive 320. The controller 310 performs the function of the CHA 210 and DKA 220 described above, and controls the transmission and reception of data between the third storage device 20 and the disk drive 320, respectively.

The first storage device 30 may have the same or substantially the same composition as the third storage device 20, or it may have a different composition to that of the third storage device 20. The first storage device 30 is able to perform data communications with the third storage device 20, based on a prescribed communications protocol (for example, FC, iSCSI, or the like), and it should comprise a storage drive (storage device), such as a disk drive 320. As described hereinafter, the logical volumes belonging to the first storage device 30 are mapped to a prescribed layer of the third storage device 20, and are used exactly as if there where internal volumes of the third storage device 20.

In the present embodiment, an example is illustrated wherein a hard disk is used as a physical storage drive, but the present invention is not limited to this. Apart from a hard disk, it may also be possible to use a semiconductor memory drive, a magnetic tape drive, an optical disk drive, a magneto-optical disk drive, or the like, as a storage drive.

Similarly to the first storage device 30, the second storage device 40 may be constituted by comprising a controller 410, a disk drive 420, and a port 411, for example. The second storage device 40 may have the same composition as the first storage device 30, or it may have a different composition.

Figure 5:
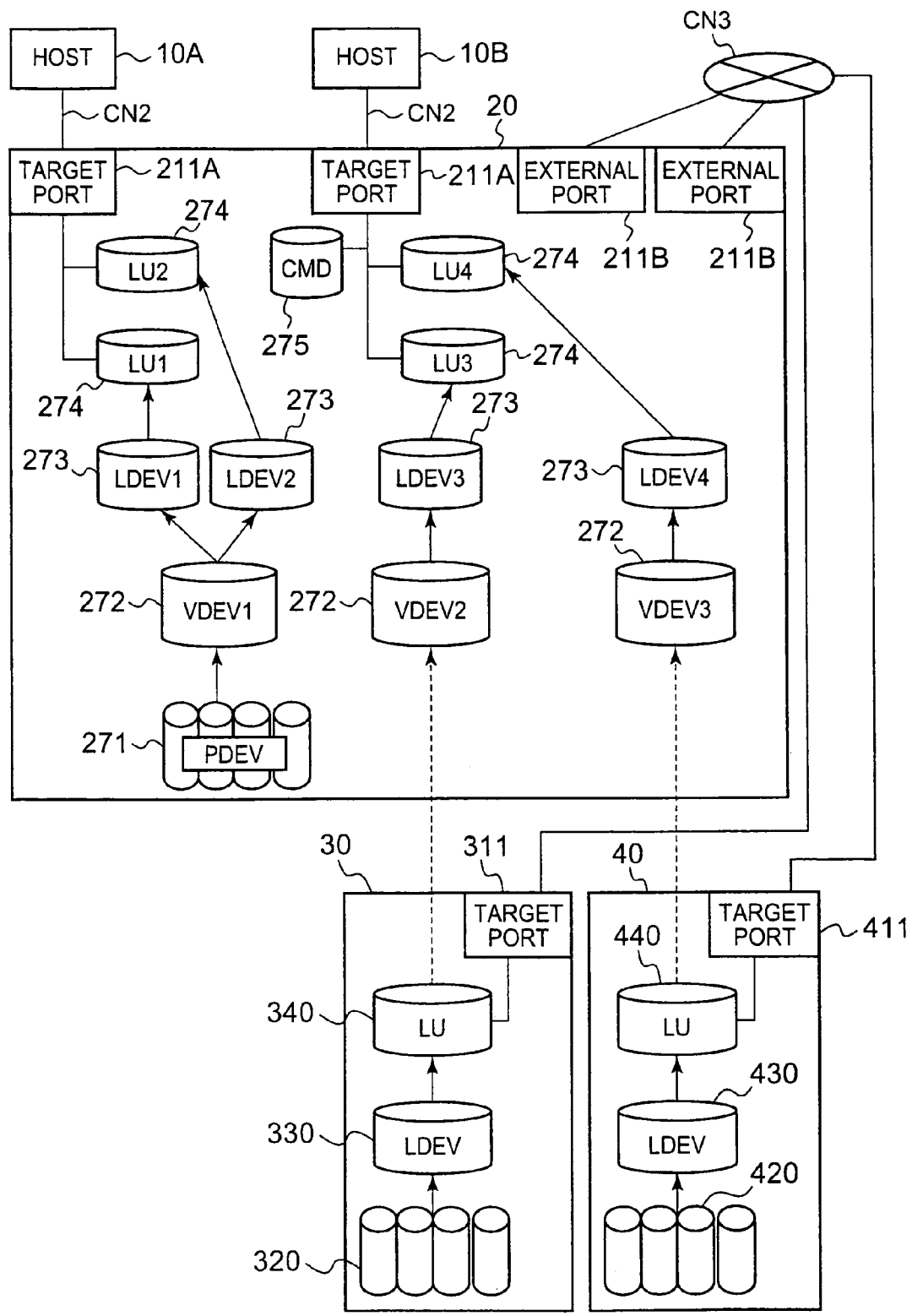
FIG. 5 is an illustrative diagram showing the storage structure of the storage system.

FIG. 5 is a compositional diagram focusing on the logical storage structure of the storage system. Firstly, the composition of the third storage device 20 will be described. The storage structure of the third storage device 20 can be divided broadly into the physical storage layer and the logical storage layer, for example. The physical storage layer is constituted by PDEVs (Physical Devices) 271, which are physical disks. The PDEVs correspond to disk drives.

The logical storage layer can be constituted by a plurality of layers (for example, layers of two types). One logical layer may be constituted by VDEVs (Virtual Devices) 272. The other logical layer may be constituted by LDEVs (Logical Device) 273.

A VDEV 272 may be constituted by grouping together a prescribed number of PDEVs 271, in order to form, for instance, one group of four (3D+1P), or one group of eight (7D+1P). One RAID storage region is formed by the collection of storage regions provided respectively by the PDEVs 271 belonging to a group. This RAID storage region forms a VDEV 272.

Here, all of the VDEVs 272 are not actually provided directly on PDEVs 271, but rather, some of the VDEVs 272 can be generated in the form of a virtual intermediate device. A virtual VDEV 272 of this kind forms a recipient for mapping the LUs (Logical Units) belonging to the external storage devices 30 and 40.

At least one or more LDEVs 273 may be provided on a VDEV 272. LDEVs 273 may be formed by dividing up a VDEV 272, into fixed lengths. If the host 10 is an open type host, then since the LDEVs 273 are mapped to a LU 274, the host 10 recognizes the LDEV 273 as a single physical disk volume. The open type host 10 accesses a desired LDEV 273 by specifying a LUN (Logical Unit Number) and a logical block address.

The LU 274 is a device that can be recognized as a logical SCSI unit. Each LU 274 is connected to the host 10 via the port 211A. Each of the LUs 274 can be associated respectively with at least one or more LDEV 273. By associating a plurality of LDEVs 273 with one LU 274, it is also possible to expand the LU size, in a virtual fashion.

The CMD (Command Device) 275 is a special LU used in order to exchange command and status information between a program running on the host 10 and the controller of the storage device (CHA 210 and DKA 220). Commands from the host 10 are written to the CMD 275. The controller of the storage device executes processing corresponding to the command written to the CMD 275 and writes execution results as status information to the CMD 275. The host 10 reads out and confirms the status written to the CMD 275 and then writes the contents of the processing that is to be executed next, to the CMD 275. In this way, the host 10 is able to issue various types of instructions to the storage device, via the CMD 275.

The first storage device 30 and the second storage device 40 are connected respectively via a communications network CN3 to initiator ports (External Port) 211B used for connecting external devices to the third storage device 20. The first storage device 30 comprises a plurality of PDEVs 320, and an LDEV established on the storage region provided by the PDEVs 320. Each LDEV 330 is associated with an LU 340. Similarly, the second storage device 40 is constituted by a plurality of PDEVs 420 and an LDEV 430, and the LDEV 430 is associated with an LU 440.

The LDEV 330 belonging to the first storage device 30 is mapped via the LU 340 to a VDEV 272 of the third storage device 20 ("VDEV2"). The LDEV 430 belonging to the second storage device 40 is mapped via the LU 440 to a VDEV 272 of the third storage device 20 ("VDEV3").

By mapping the physical volumes (LDEVs) belonging to the first and second storage devices 30 and 40 to a prescribed logical level of the third storage device 20 in this way, the third storage device 20 is able to make the volumes 330 and 430, which are located outside it, appear to the host 10 exactly as if there were volumes belonging to itself. The method for incorporating volumes situated outside the third storage device 20, into the third storage device 30, is not limited to example described above.

Figure 6:
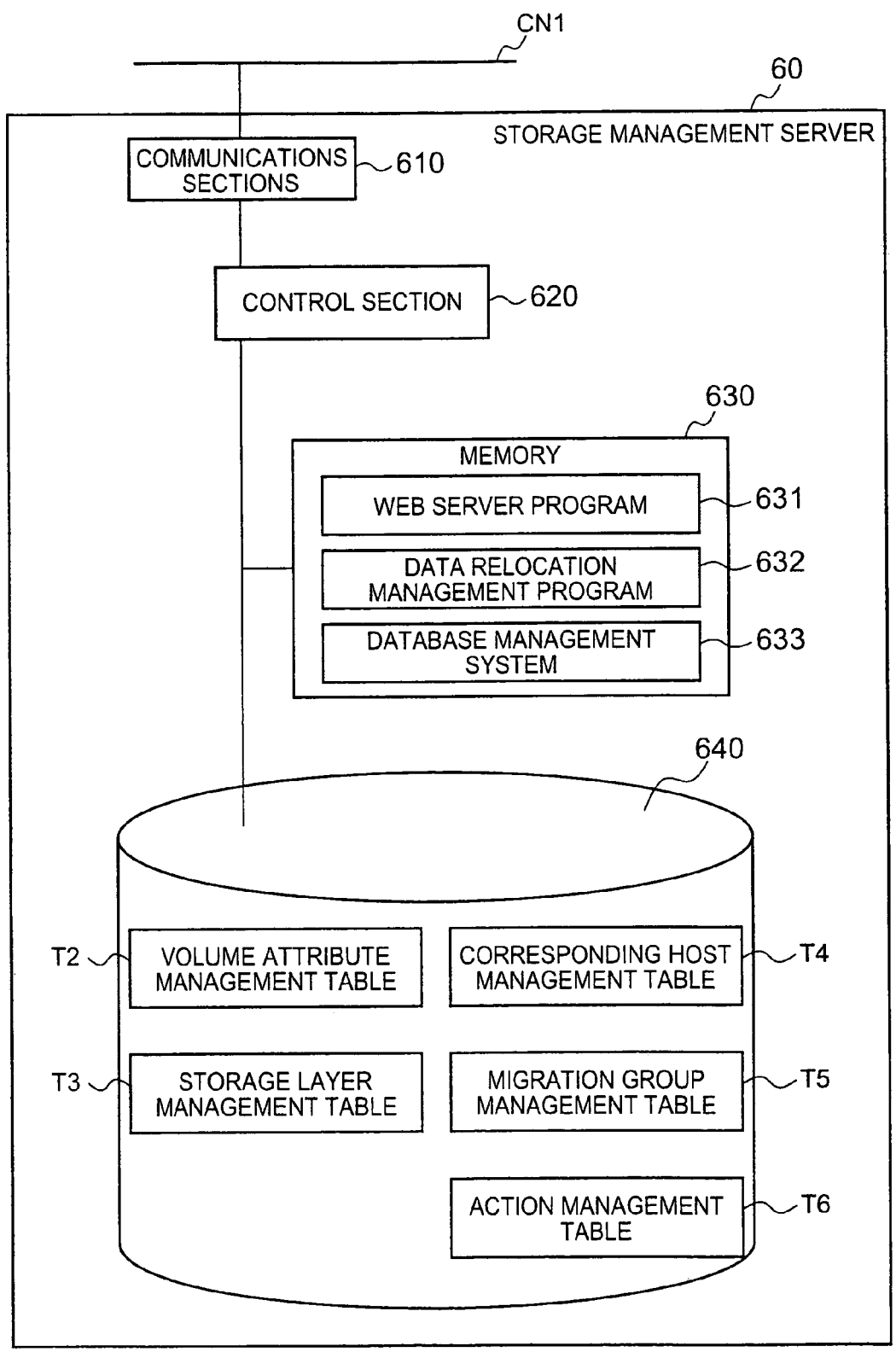
FIG. 6 is a block diagram showing the composition of a storage management server.

Next, FIG. 6 is a block diagram showing an approximate view of the hardware composition of the storage management server 60. The storage management server 60 may be constituted, for example, by comprising a communication section 610, a control section 620, a memory 630, and a volume database 640.

The communication section 610 performs data communications via the communications network CN1. The control section 620 performs overall control of the storage management server 60. The memory 630 stores, for example, a web server program 631, a data relocation management program 632, and a database management program 633.

The volume database 640 stores, for example, a volume attribute management table T2, a storage layer management table T3, a corresponding host management table T4, a migration group management table T5, and an action management table T6. An example of the composition of each of these tables is described in further detail below.

The web server program 631 provides web server functions in the storage management server 60 by being read in and executed by the control section 620. The data relocation management program 632 provides a data relocation management section in the storage management server 60, by being read in by the control section 620. The database management system 633 manages the volume database 640. The web server functions, data relocation management functions, and database management functions may be executed respectively in a parallel fashion.

FIG. 7 is an illustrative diagram showing the composition of a mapping table T1. The mapping table T1 is used to map the volumes respectively belonging to the first storage device 30 and the second storage device 40, to the third storage device 20. The mapping table T1 may also be stored in the shared memory 240 of the third storage device 20.

The mapping table T1 is constituted by associating information, such as the LUN, LDEV number, maximum slot number (capacity) for LDEV, VDEV number, maximum slot number (capacity) for VDEV, device type and path information, for example. The path information can be divided broadly into internal path information indicating a path to an internal storage region of the third storage device 20 (PDEV 271) and external path information indicating a path to a volume belonging to the first storage device 30 or the second storage device 40. The external path information may include a WWN (World Wide Name) and a LUN, for example.

FIG. 8 shows one example of a volume attribute management table T2. The volume attribute management table T2 is used to manage the attribute information for the respective volumes distributed in the storage system.

The volume attribute management table T2 can be constituted by, for example, associating each virtual volume with a logical ID for identifying that virtual volume, a physical ID for the physical volume associated with that virtual volume, a RAID level, an emulation type, a disk type, a storage capacity, a use status, and a model of storage device.

Here, the RAID level is information that indicates the composition of the RAID, such as RAID0, RAID1, RAID5, or the like, for example. The emulation type is information indicating the structure of the volume; for instance, the emulation type will be different for a volume presented to an open type host and a volume presented to a mainframe type host. The use status is information indicating whether or not that volume is in use. The device model is information indicating the model of storage device in which that volume is located.

Moreover, the logical ID is a logical volume ID presented to the host 10 by the volume virtualization device 20, and the physical ID is an ID indicating the location of the physical volume corresponding to that logical volume. The physical ID consists of a device number of the storage device where the physical volume is stored, and a volume number within that device.

Figure 9:
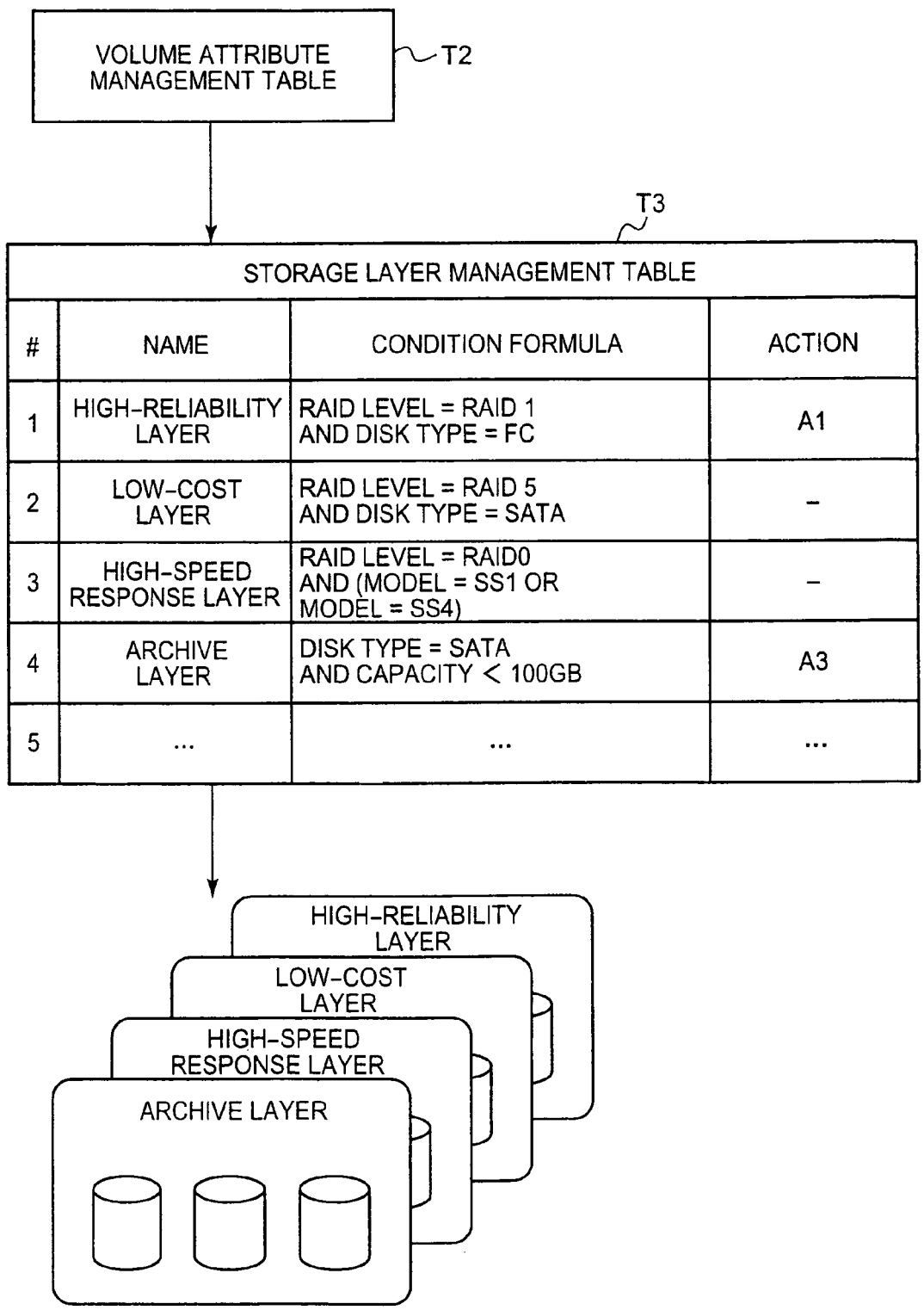
FIG. 9 is an illustrative diagram showing the composition of a storage layer management table.

FIG. 9 shows one example of a storage layer management table T3. The storage layer management table T3 may be constituted by associating, for example, a storage layer number, a storage layer name, a condition formula for defining that storage layer, and an action that is executed automatically. The action is not an essential setting and it is possible to define a storage layer without associating an action with it.

The user (system administrator, or the like) may set any desired name as the storage layer name. For example, he or she may use names, such as high-reliability layer, low-cost layer, high-speed response layer, archive layer, or the like, as the storage layer name. The search conditions for extracting the volumes that are to belong to that storage layer are set in the condition formula. The search conditions are set by the user, in accordance with the policy for that storage layer.

Depending on the search conditions, volumes formed by disks of a prescribed type in a prescribed RAID level may be detected (for instance, "RAID level=RAID and disk type=FC"), or volumes located in a particular storage device may be detected (for instance, "device model=SS1"). For example, in the high-reliability layer (#1), volumes formed by redundant highly reliable FC disks in a RAID1 configuration are selected. Accordingly, it is possible to compose a high-reliability layer by means of highly reliable volumes only. In the low-cost layer (#2), volumes formed by redundant inexpensive SATA disks in a RAID5 configuration are selected. Accordingly, it is possible to compose a low-cost layer by means inexpensive volumes of relatively small capacity, only. In the high-speed response layer (#3), volumes created by striping disks (RAID0) located in a device model capable of high-speed response are selected. Accordingly, it is possible to compose a high-speed response layer by means of volumes capable of fast I/O processing, without the need for parity calculations, or the like, only. In the archive layer (#4), volumes formed by inexpensive SATA disks having less than a prescribed capacity are selected. Accordingly, it is possible to compose an archive layer by means of low-cost volumes.

As shown in FIG. 9, by searching the volume attribute management table T2 on the basis of the condition formula set in the storage layer management table T3, a group of volumes that should belong to a particular storage layer are detected. It should be noted here that the storage layer and the group of volumes are not related directly in an explicit fashion, but rather, they are related indirectly by means of the condition formula. Accordingly, even if the physical composition of the storage system has changed in various ways, it is still possible to determine the correspondence between layers and volumes, easily.

FIG. 10 is an illustrative diagram showing one example of a corresponding host management table T4. The corresponding host management table T4 may be constituted by associating, for example, a logical ID for identifying a virtual volume, information for identifying the host accessing that virtual volume (for example, a domain name), and the name of the application program using that virtual volume.

FIG. 11 is an illustrative diagram showing one example of a migration group management table T5. A migration group is a unit used when relocating data, and in the present embodiment, a migration group is constituted by a plurality of mutually related volumes, in such a manner that data can be relocated with respect to a group unit, in a single operation. It is possible to extract a group of mutually related volumes, by searching the corresponding host management table T4 illustrated in FIG. 10.

The migration group management table T5 may associate, for example, a group number, a group name, the logical ID identifying the volume belonging to that group, and the name of the storage layer to which that group currently belongs. The name of the migration group can be specified freely by the user. In this way, each migration group may be constituted by grouping together volumes storing data groups used by the same application program, or volumes storing data groups forming the same file system. Furthermore, when data relocation has not yet been performed, for instance, immediately after a new migration group has been established, then there may be cases where a storage layer name belonging to the group has not been set.

Figure 12:
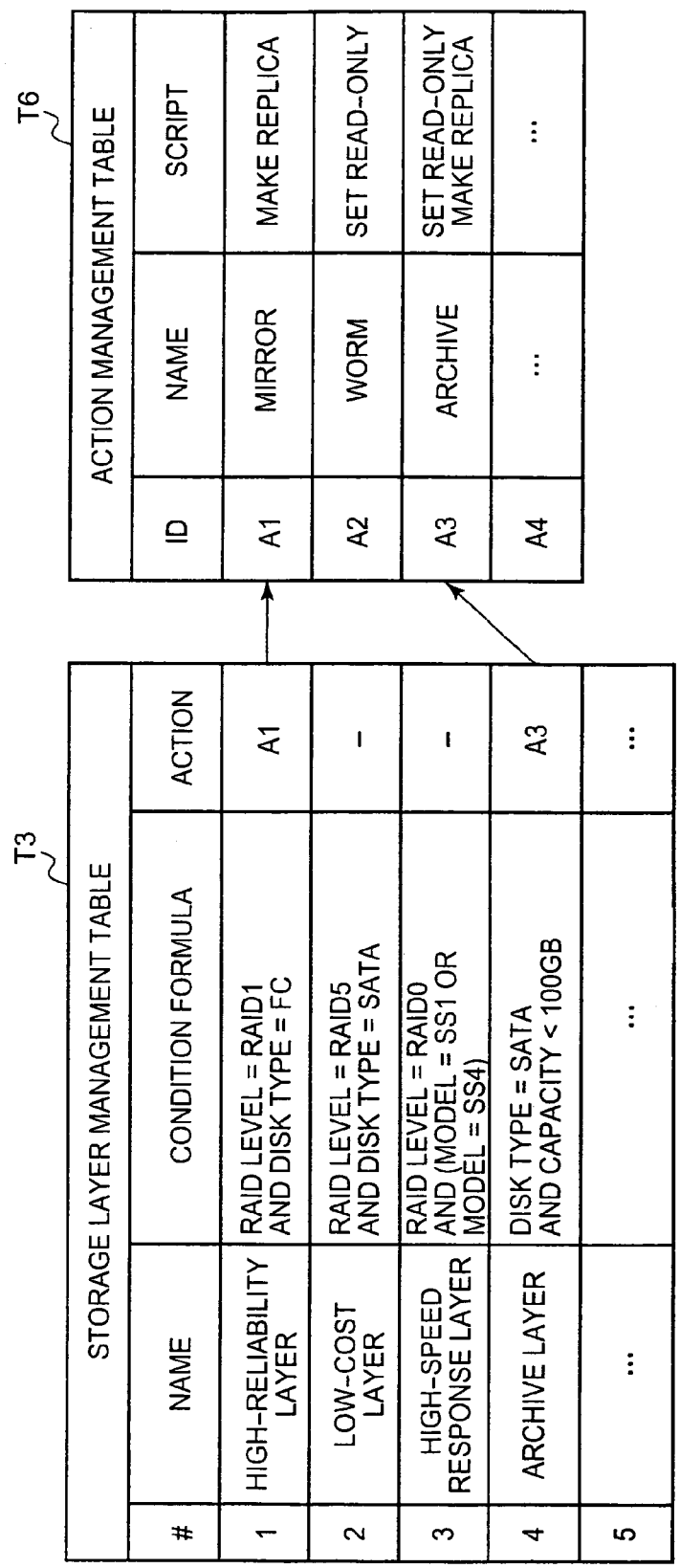
FIG. 12 is an illustrative diagram showing the composition of an action management table.

FIG. 12 is an illustrative diagram showing one example of an action management table T6. The action management table T6 defines the specific contents of the prescribed information processing or data operation previously established for a storage layer. The action management table T6 may be constituted by associating, for example, an ID for identifying an action, the name of that action, and the script (program) that is to be executed by that action, for example. Therefore, if an action ID is previously set in the storage layer management table T3, then it is possible to execute a required action by searching the action management table T6, using that action ID as a search key.

For example, in the high-reliability layer, an action ID of "A1" is set. The action ID "A1" refers to a mirroring action, and is related with script for generating a replica of the volume. Consequently, if a migration group is relocated to the high-reliability layer, then a replica of that volume group is generated. Furthermore, in the archive layer, an action ID of "A3" is set. The action ID "A3" refers to data archive processing, and is related with a plurality of scripts required for an archiving process. One of the scripts sets the access attribute to read-only, and the other script creates a replica of the volume group. An ID of "A2" in the action management table T6 permits a once-only write operation, which is known as a WORM (Write Once Read Many). This action ID is related with script for setting the access attribute to read-only.

FIG. 13 is an illustrative diagram showing a simplified view of the overall operation of data relocation. When data relocation is carried out, the user logs in to the storage management server 60 by means of the management client 50, and specifies the migration group to be relocated, and the storage layer forming the destination, respectively (S1).

The storage management server 60 when selects candidate target volumes for each of the volumes forming the designated migration group (S2). As described in more detail below, in the process of selecting candidate target volumes, one volume to which the data in the source volume can be copied is selected from all of the volumes belonging to the storage layer specified as the movement destination.

The results of the selection of candidate target volumes by the storage management server 60 are presented to the user, in the form of a volume correspondence table T7, for example (S3). The volume correspondence table T7 may be constituted by associating, for example, a logical ID of a source volume, and a logical ID of a target volume.

The user confirms the relocation proposal presented by the storage management server 60 (the volume correspondence table T7), by means of the web browser 51. If the user approves the proposal from storage management server 60, in its presented form, then relocation is executed at a prescribed timing (S5). If the proposal from the storage management server 60 is to be revised, then the user changes the logical ID of the target volume by means of the web browser 51 (S4).

Figure 14:
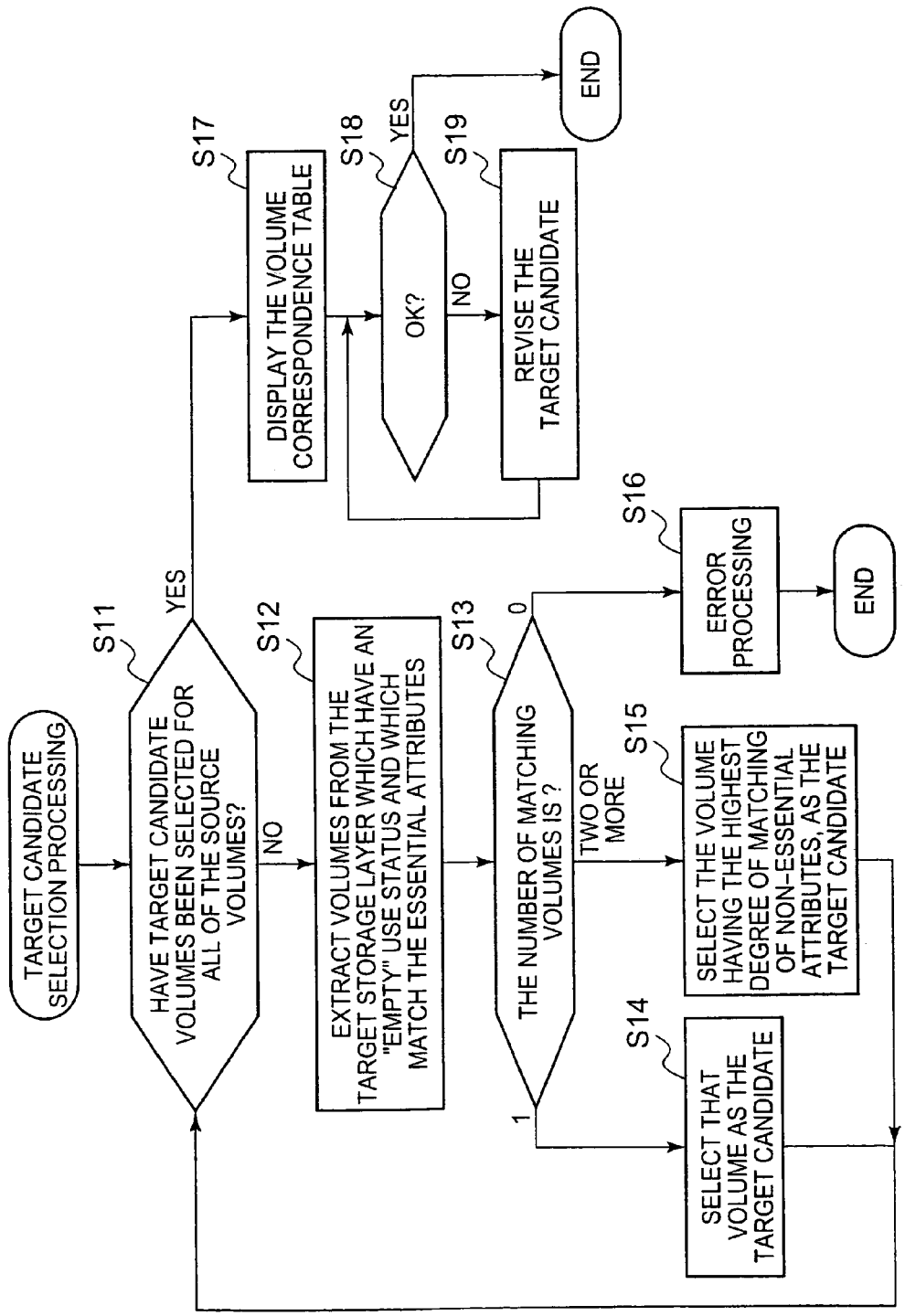
FIG. 14 is a flowchart showing target candidate selection processing.

FIG. 14 is a flowchart showing processing for selecting target candidate volumes. This process is initiated, for example, by means of the user explicitly designating a migration group that is to be relocated, and a storage layer forming the relocation destination (movement destination).

The storage management server 60 (the data relocation management program 632) judges whether or not selection of the target candidate volumes has been completed, for all of the source volumes (S11). Here, if the judgment result is "NO", then the procedure advances to S12. By referring to the volume attribute management table T2, the storage management server 60 extracts volumes which have an "empty" use status and which match the essential attributes of the source volumes, from the group of volumes belonging to the storage layer designated as the target layer (S12).

An "essential attribute" is an attribute that is required in order to copy data between volumes. If any one essential attribute is not matching, then data cannot be copied between the volumes. In the present embodiment, examples of essential attributes are the storage capacity, and the emulation type, for instance. In other words, in the present embodiment, at the very least, the storage capacity and the emulation type must be matching in the source volume and the target volume.

Next, the storage management server 60 judges the number of volumes detected to be empty volumes having the matching essential attributes (S13). If there is only one empty volume having the matching essential attributes, then that volume is selected as the target candidate volume (S14). If no empty volume matching the essential attributes is discovered at all, then this means that data cannot be relocated, and error processing is executed and a report is sent to the user (S16).

If a plurality of empty volumes having the matching essential attributes have been detected, then the storage management server 60 selects the volume having the highest degree of matching of the other attributes apart from the essential attributes (non-essential attributes), as the movement candidate volume, (S15). For example, the volume having the highest number of other attributes which are matching, such as the RAID level, disk type, model of storage device, or the like, is selected as a target candidate volume. It is also possible to calculate the degree of matching by assigning priority rankings to the respective non-essential attributes. Furthermore, if there are a plurality of volumes having the same degree of matching in respect of the non-essential attributes, then the volume having the smallest logical ID may be selected, for example.

The processing described above is carried out respectively for all of the volumes constituting the migration group that is to be moved. If corresponding target candidate volumes have been selected respectively for each one of the source volumes (S11: YES); then the storage management server 60 generates a volume correspondence table T7 and presents it to the user (S17).

The user checks the volume correspondence table T7 presented by the storage management server 60 and decides whether to approve it or to revise it. If the user approves the proposal (S18: YES), then this processing sequence terminates. If the user wishes to make changes (S18: NO), then the user can reset the target candidate volumes manually, by means of the web browser 51 (S19). When the user has finished revising the settings, the processing sequence terminates.

Figure 15:
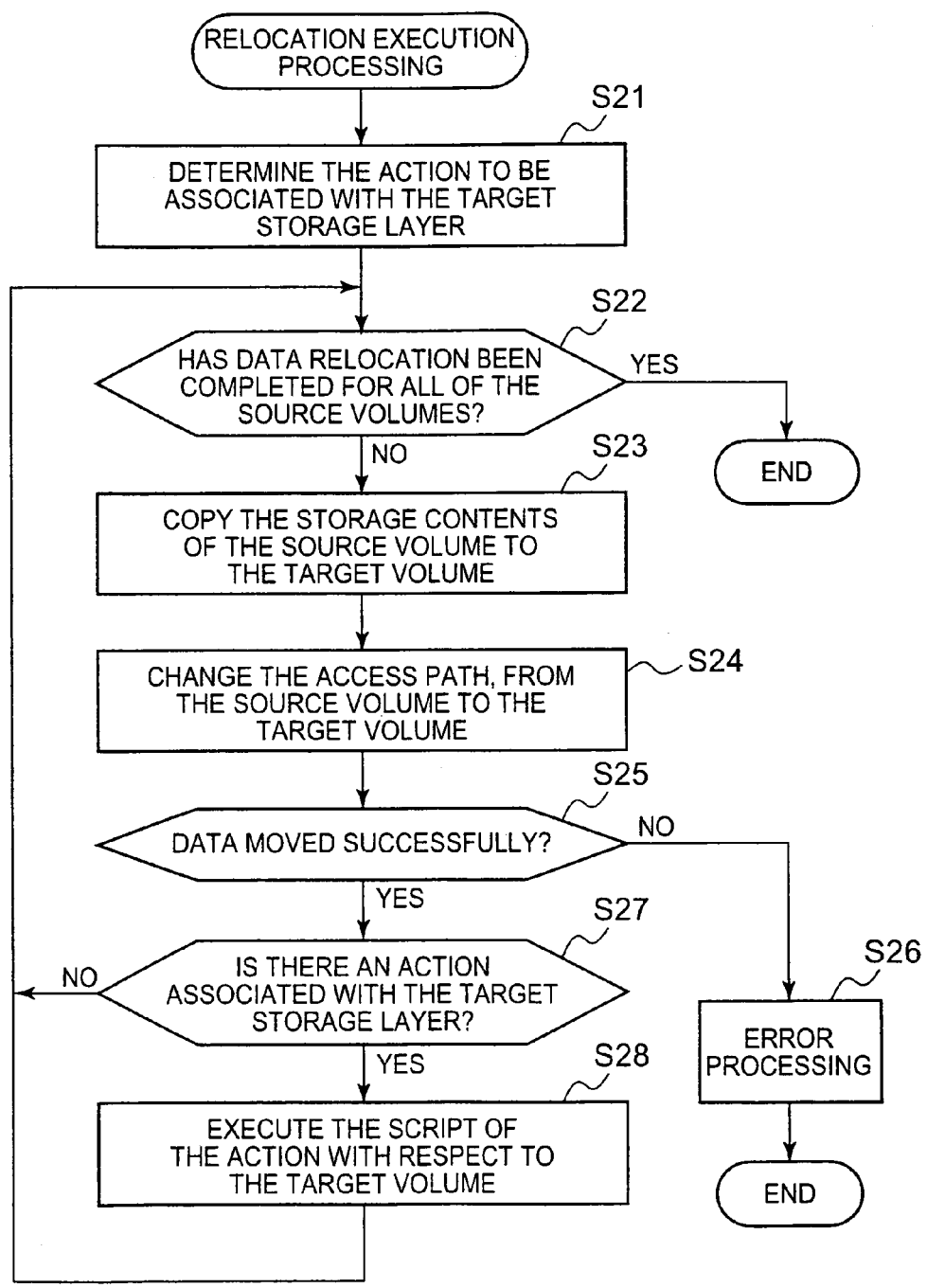
FIG. 15 is a flowchart showing relocation implementation processing.

FIG. 15 is a flowchart showing an overview of relocation implementation processing. The storage management server 60 (data relocation management program 632) detects the action associated with the storage layer designated as the movement destination, by referring to the storage layer management table T3 (S21).

Thereupon, the storage management server 60 judges whether or not relocation has been completed for all of the source volumes (S22). In the first processing sequence, the judgment result is "NO" and the process advances to the next step S23. The data stored in the source volume is copied to the target volume corresponding to that source volume (S23), and the access path is switched from the source volume to the target volume (S24). By this means, the host 10 is able to access prescribed data without altering its settings, and without being aware of the fact that the data has been relocated.

The storage management server 60 judges whether or not the movement of data from the source volume to the target volume has been completed correctly (S25), and if movement of the data has not been completed correctly (S25: NO), then error processing is carried out and the process terminates.

If the movement of data has been completed correctly (S25: YES), then the storage management server 60 checks whether or not there exists an action that has been associated with the target storage layer (S27). If an action has been established for the target storage layer (S27: YES), then the storage management server 60 refers to the action management table T6, executes the prescribed script (S28), and then returns to S22. If no action has been established for the target storage layer (S27: NO), then no action is carried out and the sequence returns to S22.

In this way, the data stored respectively in each of the volumes belonging to the migration group that is to be moved is copied respectively to target volumes, and the access paths are changed. When data movement has been completed for all of the source volumes (S22: YES), this processing sequence terminates.

FIG. 16 is an illustrative diagram showing a concrete example of the volume correspondence table T7. The results of the selection of target candidate volumes by the storage management server 60 can be displayed by arranging the source volumes and the target volumes in upper and lower rows, as illustrated in FIG. 7, for example. For each of the source volumes and the target volumes, for example, it is possible to display the corresponding logical ID, the RAID group number to which the volume belongs, the RAID level, the emulation type, and the attributes, such as the storage capacity, and the like.

The user can determine whether or not data relocation is to be executed by checking the screen illustrated in FIG. 16. In order to change the target volumes individually, the user operates the modify button B1. When this button B1 is operated, the display changes to the individual revision screen illustrated in FIG. 17.

In the revision screen illustrated in FIG. 17, the logical ID of the source volume and the emulation type and storage capacity of the source volume can be displayed in the upper portion of the screen.

The logical ID of the currently selected target volume, and its RAID group, RAID level, physical ID, the number of the storage device to which it belongs, and the physical ID of the physical volume, and the like, can be displayed in the central portion of the screen.

In the lower portion of the screen, a list of all of the candidate volumes which match the essential attributes of the source volume can be displayed. The user is able to select any one of the volumes from the volumes displayed in the volume list in the lower portion of the screen. For example, if the results of the initial selections made by the storage management server 60 are concentrated in volumes belonging to a particular RAID group, or if sequentially accessed data and randomly accessed data are located in the same RAID group, then the response characteristics of that RAID group will decline. Therefore, the user is able to revise the target volumes, individually, in such a manner that the data does not become concentrated in a particular RAID group.

By adopting the composition described above, the present embodiment has the following beneficial effects. In the present embodiment, a composition is adopted wherein a designated source volume is relocated to a designated storage layer, between a plurality of storage layers respectively generated on the basis of a plurality of previously determined policies and volume attribute information. Therefore, the user can define the storage layers freely, in accordance with a desired policy, and can relocate volumes between the storage layers, thereby improving the usability of the storage system. In particular, in a complex storage system wherein a plurality of storage devices are combined, the user is able to relocate data directly in accordance with policies set by the user himself or herself, without having to consider the detailed characteristics of each policy, or the like.

In the present embodiment, it is possible to relocate data in units of groups consisting of a plurality of volumes. Therefore, in conjunction with a composition wherein data can be relocated between the aforementioned storage layers, it is possible to improve operability for the user yet further.

In the present embodiment, it is possible previously to associate prescribed actions with a target storage layer, and therefore prescribed actions can be implemented after data relocation has been completed. Therefore, it is possible automatically to implement additional services in association with data relocation, and hence situations where the user forgets to carry out certain operations, or the like, can be prevented, and usability can be improved.

In the present embodiment, the matching of essential attributes is taken as a prerequisite condition for target volumes, and the volume having the highest degree of matching of attributes other than the essential attributes is selected as the target candidate volume. Therefore, it is possible to select appropriate volumes for relocating the data.

2. Second Embodiment

Figure 18:
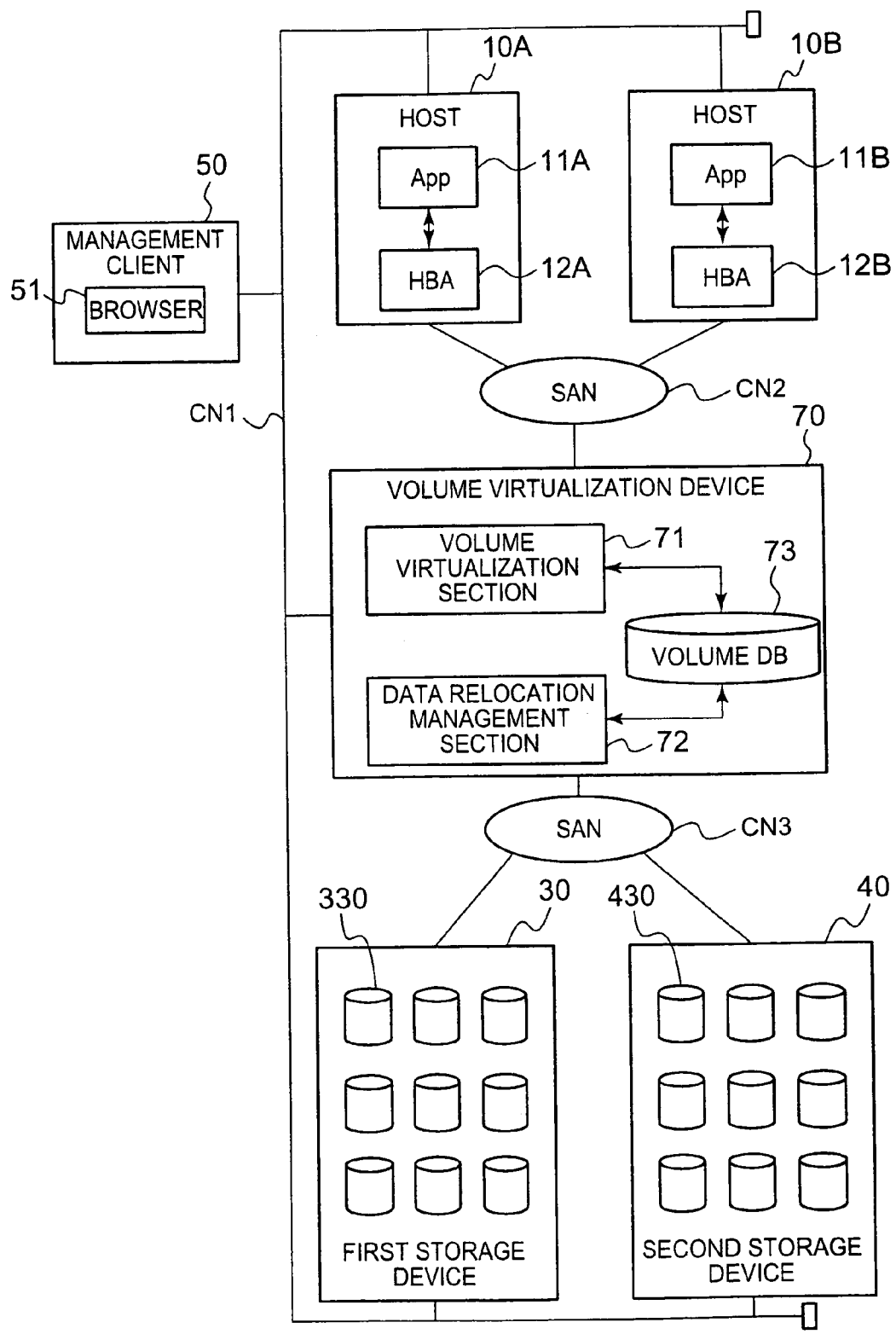
FIG. 18 is a block diagram showing a simplified view of the general composition of a storage system relating to a second embodiment of the present invention.

A second embodiment of the present invention is now described on the basis of FIG. 18. The following embodiments, including the present embodiment, correspond to modifications of the first embodiment. The characteristic feature of the present embodiment lies in the fact that the volume virtualization device 20 and the storage management server 60 mentioned in the first embodiment are concentrated in a single volume virtualization device 70.

The volume virtualization device 70 according to the present embodiment comprises a volume virtualization section 71, a data relocating section 72 and a volume database 73, for example. The volume virtualization section 71 realizes similar functions to those of the volume virtualization device 20 according to the first embodiment. The data relocating section 72 realizes similar functions to those of the data relocation management program 632 of the storage management server 60 in the first embodiment. The volume database 73 stores various tables similar to the volume database 64 of the first embodiment.

3. Third Embodiment

A third embodiment of the present invention is now described on the basis of FIG. 19. The characteristic feature of the present embodiment lies in the fact that dynamic attributes are added to the volume attribute management table T2 and the storage layers can be defined by taking these dynamic attributes into consideration.

As shown on the right hand side, the response time for data input and output (the I/O response time) can also be managed in the volume attribute management table T2 of the present embodiment. The I/O response time can be updated by means of the storage management server 60 gathering the response time from each of the storage devices 20, 30, 40, at regular intervals or irregular intervals, for example. In FIG. 19, for the sake of space, the I/O response time is shown instead of the storage device type, but the model of the storage device can also be managed as one of the volume attributes.

In this way, in the present embodiment, since dynamic attributes are also managed, in addition to static attributes, such as the RAID level, storage capacity, or the like, it is possible to take both static attributes and dynamic attributes into account when defining the storage layers. For example, a storage layer where it is sought to achieve faster response time can be constituted from volumes established on high-speed disks (FC disks), which are located in a storage device which has the smallest value for I/O response time.

4. Fourth Embodiment

Figure 20:
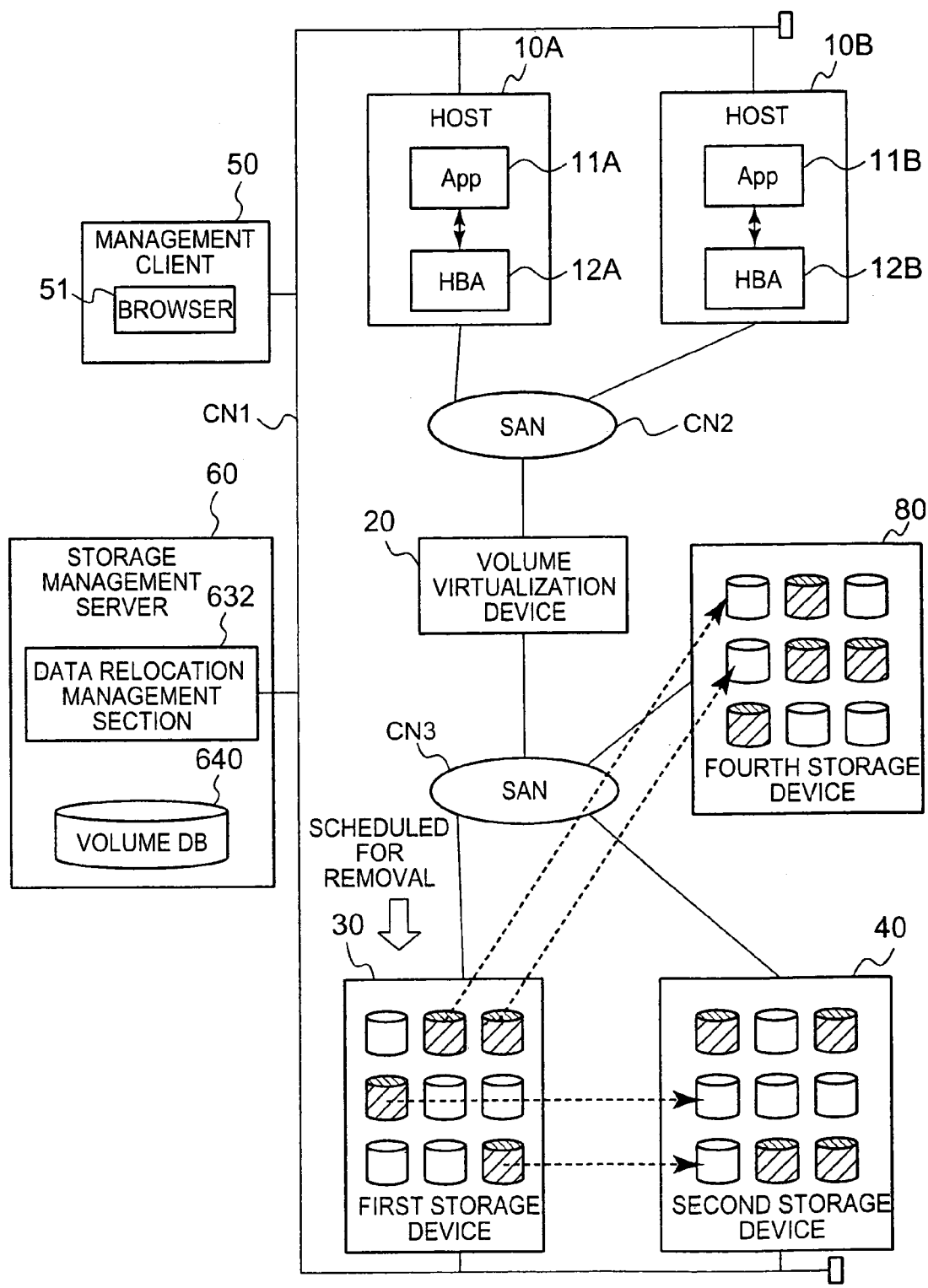
FIG. 20 is a block diagram showing the general composition of a storage system according to a fourth embodiment of the present invention.
Figure 21:
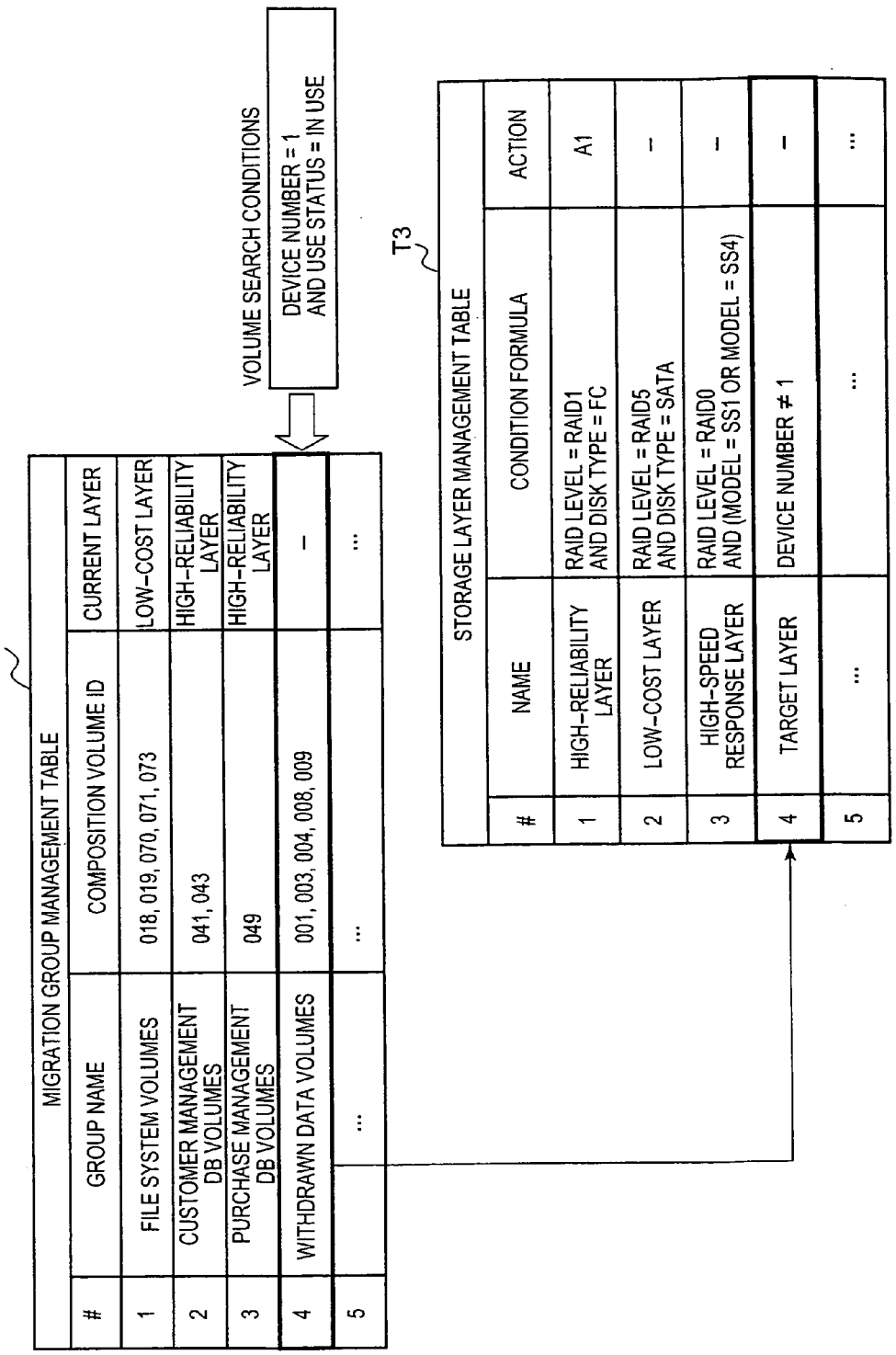
FIG. 21 is an illustrative diagram showing a schematic view of the relationship between a migration group management table and a storage layer management table.

A fourth embodiment of the present invention is now described on the basis of FIG. 20 and FIG. 21. The characteristic feature of the present embodiment lies in the fact that if there is a change in the composition of the storage system (if a storage device is removed), then the data stored in a storage device relating to that compositional change is automatically relocated to a suitable empty volume.

FIG. 20 is an illustrative diagram showing a general overview of a storage system according to the present embodiment. In this storage system, a fourth storage device 80 is added to the composition of the first embodiment. The fourth storage device 80 can be composed in the same manner as the storage devices 30 and 40, for example. The fourth storage device 80 is added here in order to simplify the description, and therefore it is not an essential element in the composition of the present invention. The present invention can be implemented satisfactorily, as long as a plurality of storage devices are provided.

In the present embodiment, an example is described wherein the first storage device 30 is removed. For example, if the usable life of the first storage device 30 has expired, or the like, then the first storage device 30 is scheduled for removal. Here, a case where the data group stored in a storage device 30 scheduled for removal is moved to other storage devices 40, 80 (or to the volume virtualization device 20 forming a third storage device; same applies hereinafter), will be described on the basis of the illustrative diagram in FIG. 21.

As shown in FIG. 21, firstly, by searching the volume attribute management table T2, the user detects a group of volumes having a status of "in use" which are located on the storage device 30 that is to be removed, and defines a migration group made up of these volumes. In FIG. 21, it is supposed that "device number 1" has been set up in the storage device 30 that is to be removed. In the drawings, a migration group name such as "withdrawn data volumes" is assigned to the volumes having an "in use" status that are located in the storage device 30 to be removed.

Next, a storage layer is defined based on the condition of "device number is different from device number of storage device to be removed (device number ≠1)". In the diagram, the storage layer name "target layer" is assigned to the storage layer constituted by the other storage devices 40, 80 apart from the storage device 30 that is to be removed. The user then instructs relocation of the aforementioned migration group "withdrawn data volumes", taking the storage layer assigned with the name "target layer" as the destination.

Thereupon, similarly to the method described in the first embodiment, the data relocation management program 632 respectively selects appropriate volumes from the storage layer designated as the destination, namely "target layer", for each of the volumes contained in the migration group "withdrawn data volumes" designated as the source, and it presents the selected volumes to the user.

In this way, volumes having a value of "empty" for the volume attribute "use status" and matching the essential attributes, or volumes having a value of "empty" for the "use status", matching the essential attributes and having the highest degree of matching in respect of the non-essential attributes, are selected as suitable target candidate volumes and presented to the user. If the user approves the assignment of volumes proposed by the data relocation management program 632, then a relocation process is carried out, and all of the data located in the storage device 30 that is to be removed is relocated to suitable volumes in the other storage devices 40 and 80.

Moreover, in cases where a new storage device is introduced, or where a portion of existing data is moved to a newly added storage device, in order to improve performance balance, the storage layer "new layer" should be defined on the basis of the condition "device number=device number of newly added storage device", and data relocation should be carried out by specifying this storage layer as a destination. Furthermore, as can be seen in the other embodiments also, in the present embodiment, it is possible for the user to define storage layers himself or herself, to specify a group of related volumes as a migration group, in one operation, and to carry out data relocation in group units.

The present invention is not limited to the embodiments described above. It is possible for a person skilled in the art to make various additions, modifications, or the like, without departing from the scope of the present invention. For example, the migration group does not have to be constituted by mutually related volumes, and indeed, any volumes may be grouped together to form a group for movement. Furthermore, the storage layers may also be established by using the storage devices as units, namely, a first storage device layer, a second storage device layer, a first storage device and second storage device layer, and the like.

What is claimed is:

1. A storage system comprising:

first and second storage devices, each of which includes a plurality of physical storages and a controller coupled to the plurality of physical storages, said first and second storage devices having at least one logical volume configured by at least one of the plurality of physical storages in the respective first or second storage device;

a virtualization device adapted to be coupled to a computer system, and coupled to the first storage device via a first communication path and to the second storage device via a second communication path, said virtualization device being adapted to manage a map between the logical volumes in the first and second storage devices and at least one virtual volume constituted by at least one of the logical volumes so that the virtualization device is able to present the logical volumes in the first and second storage devices via the at least one virtual volume to the computer system; and a management device, coupled to the virtualization device, which stores volume attribute information of the logical volumes, defines storage layers each including at least two of said logical volumes of said first and second storage devices and spanning the first and second storage devices, based upon the stored volume attribute information of the logical volumes and a policy, relocates a designated source volume from an originating storage layer among the defined storage layers to a designated target storage layer among the defined storage layers with respect to the policy.

2. The storage system according to claim 1, wherein the policy can be set as desired by a user, and a same logical volume can belong to different storage layers.

3. The storage system according to claim 1, wherein the management device relocates a plurality of designated source volumes, in units of migration groups, each migration group consisting of a plurality of volumes.

4. The storage system according to claim 3, wherein each migration group is composed of a plurality of volumes storing mutually related data.

5. The storage system according to claim 1, wherein the management device manages prescribed processing that has been associated previously with the designated target storage layer, with respect to the relocated volume, when the designated source volume has been relocated to the designated target storage layer.

6. The storage system according to claim 1, wherein, when the management device is to relocate the designated source volume to the designated target storage layer, the virtualization device invokes a copy operation of data of said designated source volume to a target volume belonging to the designated target storage layer, and upon completion of the copy operation, changes the access path, from the designated source volume to the designated target volume.

7. The storage system according to claim 1, wherein the management device selects a target candidate volume to which the storage contents of the designated source volume can be copied, and presents the target candidate volume selected by the management device, to the user; and wherein the management device refers to the volume attribute information and thereby selects a volume having matching essential attributes that are previously established from among the attributes of the designated source volume, as the target candidate volume.

8. The storage system according to claim 7, wherein, if there are a plurality of target candidate volumes having the matching essential attributes, then the management device selects one of said target candidate volumes, on the basis of the degree of matching of other attributes apart from the essential attributes.

9. The storage system according to claim 8, wherein the management device changes the target candidate volume selected by the management device, and causes the target candidate volume to be selected from among the target candidate volumes that have the matching essential attributes but are not selected.

10. The storage system according to claim 7, wherein the attribute information comprises static attributes and dynamic attributes, and prescribed attributes of the static attributes are set as the essential attributes.

11. The storage system according to claim 7, wherein the essential attributes include, at the least, the storage capacity of the volume.

12. The storage system according to claim 1, having storage layer management information containing policy identification information for identifying each of a plurality of policies, and layer composition conditions respectively associated with each of the policy identification information;

wherein said storage layers are generated to correspond to the policies respectively by means of a group of logical volumes satisfying the respective layer composition conditions.

13. The storage system according to claim 12, wherein the layer composition conditions include at least one of the Redundant Array of Inexpensive Disks (RAID) level, the drive type, the storage capacity, the type of storage device, the device number of the storage device, and the use status.

14. A storage system comprising:

first and second storage devices, each of which includes a plurality of physical storages and a controller coupled to the plurality of physical storages, said first and second storage devices having at least one logical volume configured by at least one of the plurality of physical storages in the respective first or second storage device; and a volume virtualization device adapted to be coupled to a computer system, and coupled to the first storage device via a first communication path and to the second storage device via a second communication path, said volume virtualization device being adapted to manage a map between the logical volumes in the first and second storage devices and at least one virtual volume constituted by at least one of the logical volumes so that the volume virtualization device is able to present the logical volumes in the first and second storage devices via the at least one virtual volume to the computer system, and which stores volume attribute information of the logical volumes, defines storage layers each including at least two of said logical volumes of said first and second storage devices and spanning the first and second storage devices, based upon the stored volume attribute information of the logical volumes and a policy, and relocates a designated source volume from an originating storage layer among the defined storage layers to a designated target storage layer among the defined storage layers with respect to the policy.

15. The storage system according to claim 14, wherein the policy can be set as desired by a user, and a same logical volume can belong to different storage layers.

16. The storage system according to claim 14, wherein the volume virtualization device relocates a plurality of designated source volumes, in units of migration groups, each migration group consisting of a plurality of volumes.

17. The storage system according to claim 16, wherein each migration group is composed of a plurality of volumes storing mutually related data.

18. The storage system according to claim 14, wherein the volume virtualization device manages prescribed processing that has been associated previously with the designated target storage layer, with respect to the relocated volume, when the designated source volume has been relocated to the designated target storage layer.

19. The storage system according to claim 14, wherein, when the volume virtualization device is to relocate the designated source volume to the designated target storage layer, the volume virtualization device invokes a copy operation of data of said designated source volume to a target volume belonging to the designated target storage layer, and upon completion of the copy operation, changes the access path, from the designated source volume to the designated target volume.

20. The storage system according to claim 14, wherein the volume virtualization device selects a target candidate volume to which the storage contents of the designated source volume can be copied, and presents the target candidate volume selected by the volume virtualization device, to the user; and wherein the volume virtualization device refers to the volume attribute information and thereby selects a volume having matching essential attributes that are previously established from among the attributes of the designated source volume, as the target candidate volume.

21. The storage system according to claim 20, wherein, if there are a plurality of target candidate volumes having the matching essential attributes, then the volume virtualization device selects one of said target candidate volumes, on the basis of the degree of matching of other attributes apart from the essential attributes.

22. The storage system according to claim 21, wherein the volume virtualization device changes the target candidate volume selected by the volume virtualization device, and causes the target candidate volume to be selected from among the target candidate volumes that have the matching essential attributes but are not selected.

23. The storage system according to claim 22, wherein the attribute information comprises static attributes and dynamic attributes, and prescribed attributes of the static attributes are set as the essential attributes.

24. The storage system according to claim 20, wherein the essential attributes include, at the least, the storage capacity of the volume.

25. The storage system according to claim 14, having storage layer management information containing policy identification information for identifying each of a plurality of policies, and layer composition conditions respectively associated with each of the policy identification information;
wherein said storage layers are generated to correspond to the policies respectively by means of a group of logical volumes satisfying the respective layer composition conditions.

26. The storage system according to claim 25, wherein the layer composition conditions include at least one of the Redundant Array of Inexpensive Disks (RAID) level, the drive type, the storage capacity, the type of storage device, the device number of the storage device, and the use status.

27. A storage system comprising:
first and second storage devices, each of which includes a plurality of physical storages and a controller coupled to the plurality of physical storages, said first and second storage devices having at least one logical volume configured by at least one of the plurality of physical storages in the respective first or second storage device; and
a third storage device adapted to manage a map between the logical volumes in the first and second storage devices and at least one virtual volume constituted by at least one of the logical volumes so that the third storage device is able to present the logical volumes in the first and second storage devices via the at least one virtual volume to a computer system, and which stores volume attribute information of the logical volumes, defines storage layers each including at least two of said logical volumes of said first and second storage devices and spanning the first and second storage devices, based upon the stored volume attribute information of the logical volumes and a policy, and relocates a designated source volume from an originating storage layer among the defined storage layers to a designated target storage layer among the defined storage layers with respect to the policy.

28. The storage system according to claim 27, wherein the policy can be set as desired by a user, and a same logical volume can belong to different storage layers.

29. The storage system according to claim 27, wherein the third storage device relocates a plurality of designated source volumes, in units of migration groups, each migration group consisting of a plurality of volumes.

30. The storage system according to claim 29, wherein each migration group is composed of a plurality of volumes storing mutually related data.

31. The storage system according to claim 27, wherein the third storage device manages prescribed processing that has been associated previously with the designated target storage layer, with respect to the relocated volume, when the designated source volume has been relocated to the designated target storage layer.

32. The storage system according to claim 27, wherein, when the third storage device is to relocate the designated source volume to the designated target storage layer, the third storage device invokes a copy operation of data of said designated source volume to a target volume belonging to the designated target storage layer, and upon completion of the copy operation, changes the access path, from the designated source volume to the designated target volume.

33. The storage system according to claim 27, wherein the third storage device selects a target candidate volume to which the storage contents of the designated source volume can be copied, and presents the target candidate volume selected by the third storage device, to the user; and
wherein the third storage device refers to the volume attribute information and thereby selects a volume having matching essential attributes that are previously established from among the attributes of the designated source volume, as the target candidate volume.

34. The storage system according to claim 33, wherein, if there are a plurality of target candidate volumes having the matching essential attributes, then the third storage device selects one of said target candidate volumes, on the basis of the degree of matching of other attributes apart from the essential attributes.

35. The storage system according to claim 34, wherein the third storage device changes the target candidate volume selected by the third storage device, and causes the target candidate volume to be selected from among the target candidate volumes that have the matching essential attributes but are not selected.

36. The storage system according to claim 33, wherein the attribute information comprises static attributes and dynamic attributes, and prescribed attributes of the static attributes are set as the essential attributes.

37. The storage system according to claim 33, wherein the essential attributes include, at the least, the storage capacity of the volume.

38. The storage system according to claim 27, having storage layer management information containing policy identification information for identifying each of a plurality of policies, and layer composition conditions respectively associated with each of the policy identification information;
wherein said storage layers are generated to correspond to the policies respectively by means of a group of logical volumes satisfying the respective layer composition conditions.

39. The storage system according to claim 38, wherein the layer composition conditions include at least one of the Redundant Array of Inexpensive Disks (RAID) level, the drive type, the storage capacity, the type of storage device, the device number of the storage device, and the use status.

* * * * *